(12) United States Patent
Ide et al.

(10) Patent No.: US 9,229,584 B2
(45) Date of Patent: Jan. 5, 2016

(54) INFORMATION INPUT APPARATUS

(75) Inventors: Masafumi Ide, Saitama (JP); Masaya Suzuki, Saitama (JP); Yosuke Abe, Tokyo (JP); Takaaki Nozaki, Saitama (JP); Akio Yoshinaga, Tokyo (JP); Yuji Noda, Tokyo (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 3 days.

(21) Appl. No.: 14/125,613

(22) PCT Filed: May 31, 2012

(86) PCT No.: PCT/JP2012/064217
§ 371 (c)(1),
(2), (4) Date: Dec. 12, 2013

(87) PCT Pub. No.: WO2012/173001
PCT Pub. Date: Dec. 20, 2012

(65) Prior Publication Data
US 2014/0104163 A1   Apr. 17, 2014

(30) Foreign Application Priority Data

Jun. 13, 2011 (JP) ................................ 2011-131098
Jun. 24, 2011 (JP) ................................ 2011-140903

(51) Int. Cl.
*G06F 3/042* (2006.01)
*G06F 3/01* (2006.01)
*H04N 9/31* (2006.01)

(52) U.S. Cl.
CPC ............. *G06F 3/0425* (2013.01); *G06F 3/017* (2013.01); *G06F 3/0426* (2013.01); *H04N 9/3179* (2013.01); *H04N 9/3194* (2013.01)

(58) Field of Classification Search
CPC ......... G06F 3/016; G06F 3/011; G06F 3/038; G06F 3/0354; G06F 3/0338
See application file for complete search history.

(56) References Cited

U.S. PATENT DOCUMENTS 8,181,123 B2    5/2012  Stone-Perez et al.
2003/0043303 A1*  3/2003  Karuta et al. ................. 348/744
(Continued)

FOREIGN PATENT DOCUMENTS

CN    100465995 C    3/2009
CN    101796474 A    8/2010
(Continued)

OTHER PUBLICATIONS

International Search Report for PCT/JP2012/064217, Jul. 24, 2012.
(Continued)

*Primary Examiner* — Md Saiful A Siddiqui

(57) ABSTRACT

The present invention is directed to the provision of an information input apparatus that can change the projection position of an input image by tracking a target object and can detect an information input to the input image. More specifically, the invention provides an information input apparatus includes a projection unit which projects an input image, a projection position changing unit which changes the projection position of the input image, a detection sensor which detects the position of a detection target, and an information detection unit which causes the projection position changing unit to change the projection position of the input image by tracking the position of the detection target detected by the detection sensor, and which detects an information input to the input image based on data supplied from the detection sensor.

5 Claims, 32 Drawing Sheets

(56) References Cited

U.S. PATENT DOCUMENTS

| | | | |
|---|---|---|---|
| 2005/0206770 A1* | 9/2005 | Nathanson et al. | 348/333.1 |
| 2009/0100767 A1 | 4/2009 | Kondo et al. | |
| 2009/0102788 A1 | 4/2009 | Nishida et al. | |
| 2010/0199232 A1* | 8/2010 | Mistry et al. | 715/863 |
| 2010/0302464 A1 | 12/2010 | Raring et al. | |
| 2011/0169746 A1* | 7/2011 | Kitajima | 345/173 |

FOREIGN PATENT DOCUMENTS

| | | |
|---|---|---|
| JP | H11-095895 A | 4/1999 |
| JP | 2007-013306 A | 1/2007 |
| JP | 2009-104297 A | 5/2009 |
| JP | 2011-049865 A | 3/2011 |
| WO | 2010/044204 A1 | 4/2010 |
| WO | 2010/109621 A1 | 9/2010 |
| WO | 2010/127121 A2 | 11/2010 |

OTHER PUBLICATIONS

Yoko Ishii et al., "Palm Interface: A Display Personally to Show Information in Public Spaces by Using Image Processing," IPSJ (Information Processing Society of Japan) Transactions, vol. 49, No. 7, 2528-2538, Jul. 2008.

Extended European search report for EP Application No. 12800654.1, Jan. 27, 2015.

English Translation of "Goshiro Yamamoto et al., "Toei-gata Fukugo Genjitsukan o Riyo sita Sintai Interface Tenohira o Screen to suru Camera Projector-gata Wearable System" Image Lab, vol. 18, no. 2, pp. 21 to 24, Feb. 1, 2007".

Japan Patent Office, Japanese Office Action for Japanese Patent Application No. 2013-520505, Oct. 27, 2015.

The State Intellectual Property Office of the People'S Republic of China (SIPO), Office Action for Chinese Patent Application No. 201280029020.0, Oct. 21, 2015.

* cited by examiner

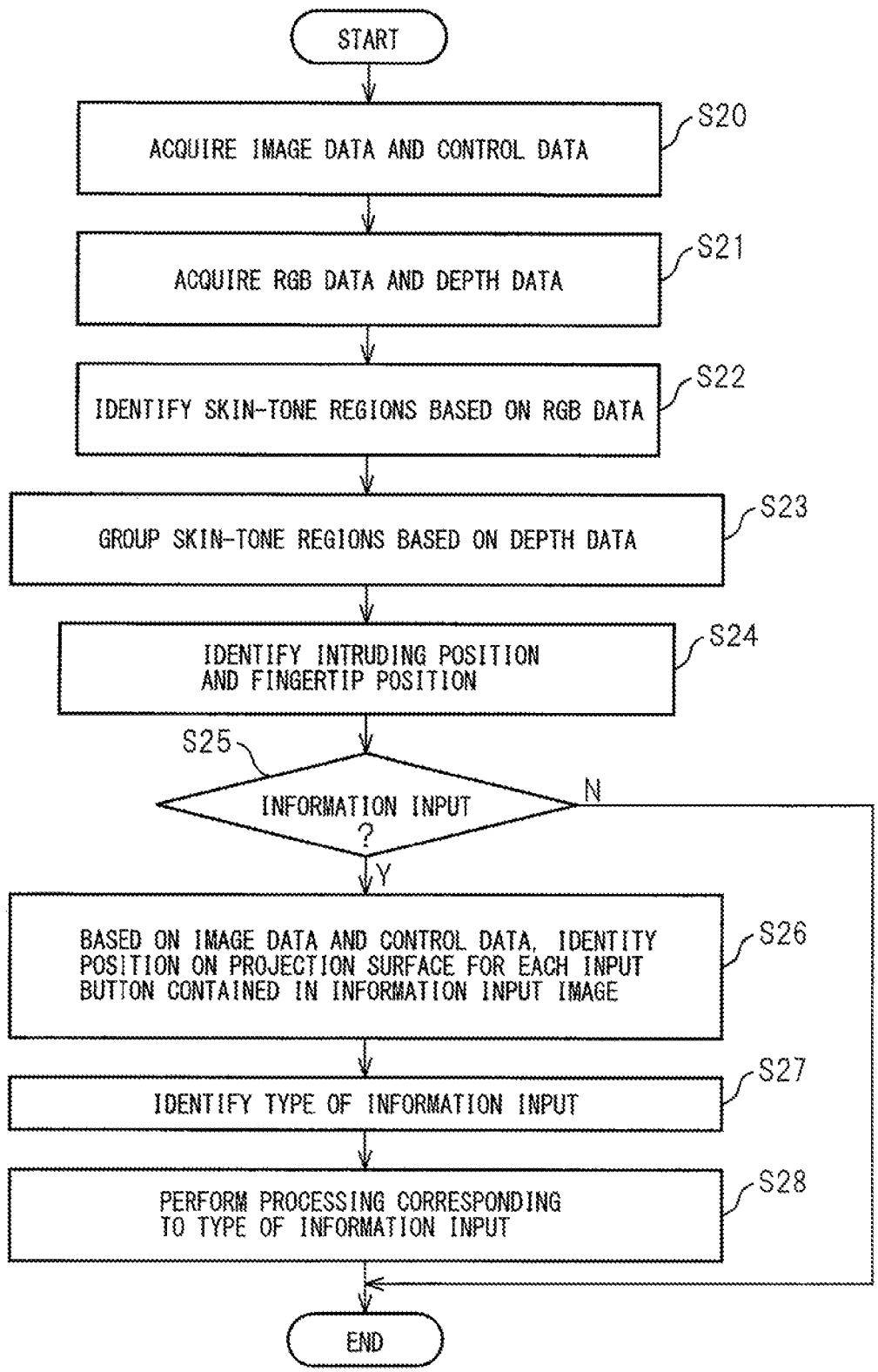

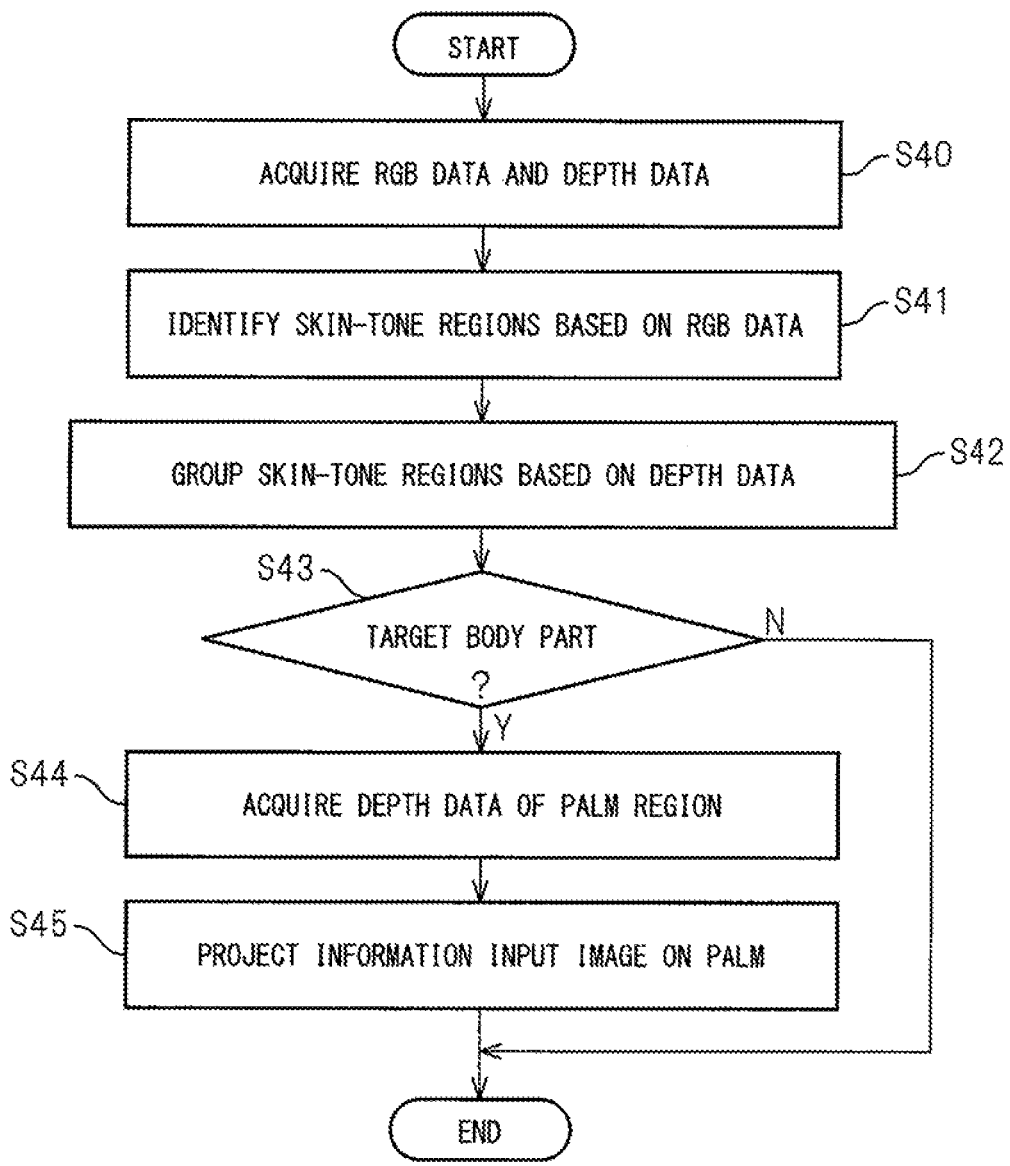

INFORMATION INPUT APPARATUS

TECHNICAL FIELD

The present invention relates to an information input apparatus, and more particularly to an information input apparatus that uses a projected image for information input.

BACKGROUND

Generally, an information input apparatus such as a remote control apparatus is used to input information in order operate a television set, a video recorder, or the like. However, when it comes time to use the remote control apparatus or like, the user may have trouble in locating the apparatus because, for example, the user does not know where the apparatus is placed, and hence the problem that the user cannot use the apparatus when he desires to use it.

In view of the above, there has developed a need for an information input apparatus that is simple to operate and easy to understand and that can be intuitively used by any person without having to operate the information input apparatus itself.

In the prior art, it is known to provide an information input apparatus that projects an image representing an operation unit having a plurality of input keys by using an image projection apparatus, and that detects the motion of a finger on the image by image recognition and determines whether or not an operation has been performed to depress any input key (for example, refer to patent document 1).

In patent document 1, the motion of the finger on the image is detected by first identifying the finger by edge detection from an image read by an imaging unit and then detecting the up-down motion of the finger, that is, the motion of the finger touching the surface on which the image is projected.

It is also known to provide a wearable gesture interface in which a projector is worn by a user and an image of a dial pad is projected on the palm of the user's hand, wherein when the dial pad projected on the palm is pointed to by a device worn on the user's fingertip, an input corresponding to the dial pad thus pointed to is implemented (for example, refer to patent document 2).

In the gesture interface disclosed in patent document 2, the image captured by a camera is analyzed by a computer, and the movement of the device worn on the user's fingertip is tracked to determine whether there is any corresponding input to the dial pad. Further, since the image from the projector is projected after being reflected by a mirror, the user can change the image projection position by manually changing the position of the mirror.

A system is also known in the art which detects a palm within a predetermined range where an image can be projected, and which projects stars, a haiku, or the contents of an illustrated reference book on the detected palm (for example, refer to patent document 3). In the system of patent document 3, the projection direction of the projector is fixed, but since the projection is made over the entire area of the predetermined range, the image is displayed only on the detected palm portion.

PRIOR ART DOCUMENTS

Patent document 1: Japanese Unexamined Patent Publication No. H11-95895 (FIG. 1)

Patent document 2: U.S. Patent Application No. 2010/0199232 (FIG. 12)

Patent document 3: "Palm Interface: A Display Personally to Show Information in Public Spaces by Using Image Processing," IPSJ (Information Processing Society of Japan) Transactions, Vol. 49, No. 7, 2528-2538, July 2008.

SUMMARY

However, the method of detecting finger motions by detecting edges in an image has had the deficiency that an object other than a human's finger may be erroneously recognized as being a finger or, when a human has an article in his hand, the tip of that article may be erroneously recognized as being a finger.

On the other hand, the gesture interface disclosed in patent document 2 has had the deficiency that the user has to wear an apparatus containing the projector, etc. and may therefore find the operation bothersome compared with a conventional remote control apparatus.

The gesture interface disclosed in patent document 2 has had the further deficiency that, since the projector is fixed, the dial pad cannot be projected on the palm without bringing the palm into the projection position, though the projection position can be changed manually by changing the position of the mirror.

In the system disclosed in patent document 3, since the projection direction of the projector is fixed, a large projector capable of projecting an image over the entire area of the predetermined range has to be used if the desired image is to be displayed on the detected palm.

Accordingly, it is an object of the present invention to provide an information input apparatus wherein provisions are made to solve the above deficiencies.

It is another object of the present invention to provide an information input apparatus that can change the projection position of an information input image by tracking a target object and can detect an information input to the information input image.

It is still another object of the present invention to provide an information input apparatus that can display an information input image on a user's target body part by tracking the position of the user's target body part.

It is yet another object of the present invention to provide an information input apparatus can prevent an erroneous detection by recognizing a fingertip in a reliable manner.

It is a further object of the present invention to provide an information input apparatus that can prevent an erroneous detection by recognizing a fingertip in a reliable manner even when the user is wearing an accessory such as a ring or a wrist watch on it.

It is a still further object of the present invention to provide an information input apparatus that enables information to be input by using a part of a user's body without requiring the user to wear a specific apparatus.

It is a yet further object of the present invention to provide an information input apparatus that can prevent an erroneous detection by recognizing a fingertip in a reliable manner even when the user is wearing an accessory such as a ring or a wrist watch on it.

There is provided an information input apparatus includes a projection unit which projects an input image, a projection position changing unit which changes the projection position of the input image, a detection sensor which detects the position of a detection target, and an information detection unit which causes the projection position changing unit to change the projection position of the input image by tracking the position of the detection target detected by the detection sensor, and which detects an information input to the input image based on data supplied from the detection sensor.

Preferably, in the information input apparatus, the detection sensor includes an infrared sensor.

Preferably, in the information input apparatus, the detection sensor includes a color detection sensor.

Preferably, in the information input apparatus, the information detection unit performs control so that the input image is projected on the detection target by controlling the projection position changing unit.

Preferably, in the information input apparatus, the information detection unit detects the information input to the input image by identifying the position of the detection target on the input image based on the data supplied from the detection sensor.

Preferably, in the information input apparatus, the projection unit includes a light emitting part which projects a beam by using a MEMS mirror.

Preferably, in the information input apparatus, the projection unit includes a light emitting part which projects a beam by using a micro-display method.

Preferably, in the information input apparatus, the projection position changing unit includes a first rotation axis for panning the projection unit and a second rotation axis for tilting the projection unit.

There is provided an information input apparatus includes a projection unit which projects an information input image containing an input button, a color detection sensor for detecting a color, and a control unit which identifies a fingertip position based on data supplied from the color detection sensor, and which determines whether an information input has been done by the input button corresponding to the fingertip position.

Preferably, the information input apparatus further includes a depth detection sensor for detecting depth, wherein the control unit determines that an information input has been done by the input button when the depth of the identified fingertip position is approximately equal to the depth of the fingertip position on a projection surface.

Preferably, the information input apparatus further includes a storage unit which, based on data supplied from the depth detection sensor, stores in advance the depth detected on the projection surface on which the information input image is projected by the projection unit.

Preferably, in the information input apparatus, the control unit identifies objects judged to have a specific color based on the data supplied from the color detection sensor, and recognizes, from among the identified objects, objects having the same depth data as being one intruding object.

Preferably, in the information input apparatus, the control unit identifies the fingertip position based on the position at which the recognized intruding object has intruded into a detection region.

There is provided an information input apparatus includes a projection unit which projects an information input image containing an input button, a color detection sensor for detecting a color, a depth detection sensor for detecting depth, and a control unit which, based on data supplied from both the color detection sensor and the depth detection sensor, identifies the position of a user's target body part, and which controls the projection unit so that the information input image is projected on the target body part, wherein the control unit identifies a fingertip position based on the data supplied from the color detection sensor, and determines whether an information input has been done by the input button corresponding to the fingertip position.

Preferably, in the information input apparatus, the control unit determines that an information input has been done by the input button when the depth of the identified fingertip position is approximately equal to the depth of the target body part.

Preferably, the information input apparatus further includes a storage unit which, based on the data supplied from the depth detection sensor, stores in advance the depth detected at a reference position within a space in which the information input image is projected by the projection unit.

Preferably, in the information input apparatus, the target body part is the palm of the user's hand.

Preferably, in the information input apparatus, the projection unit includes a fiber scanning-type light emitting part or a light emitting part that uses a spatial light phase modulator or a MEMS mirror.

In the information input apparatus, since the fingertip position is identified based on the data supplied from the color detection sensor, it becomes possible to prevent an erroneous detection by recognizing the fingertip in a reliable manner.

Further, in the information input apparatus, since the fingertip position is identified based on the data supplied from both the color detection sensor and the depth detection sensor, it becomes possible to prevent an erroneous detection by recognizing the fingertip in a reliable manner even when the user is wearing an accessory such as a ring or a wrist watch on it.

Further, in the information input apparatus, since the information input image can be projected on a part of the user's body, and information can be input to the information input image by using another part of the user's body, it becomes possible to perform an information input operation in a simple and easy manner without requiring the user to wear a specific apparatus.

Further, in the information input apparatus, since the fingertip position is identified based on the data supplied from the color detection sensor, it becomes possible to prevent an erroneous detection by recognizing the fingertip in a reliable manner.

Further, in the information input apparatus, since the fingertip position is identified based on the data supplied from both the color detection sensor and the depth detection sensor, it becomes possible to prevent an erroneous detection by recognizing the fingertip in a reliable manner even when the user is wearing an accessory such as a ring or a wrist watch on it.

BRIEF DESCRIPTION OF THE DRAWINGS

FIG. 7 is a diagram showing one example of a control flow of the information input apparatus.

FIG. 23 is a diagram showing one example of a palm detection flow.

DESCRIPTION

Figure 1:
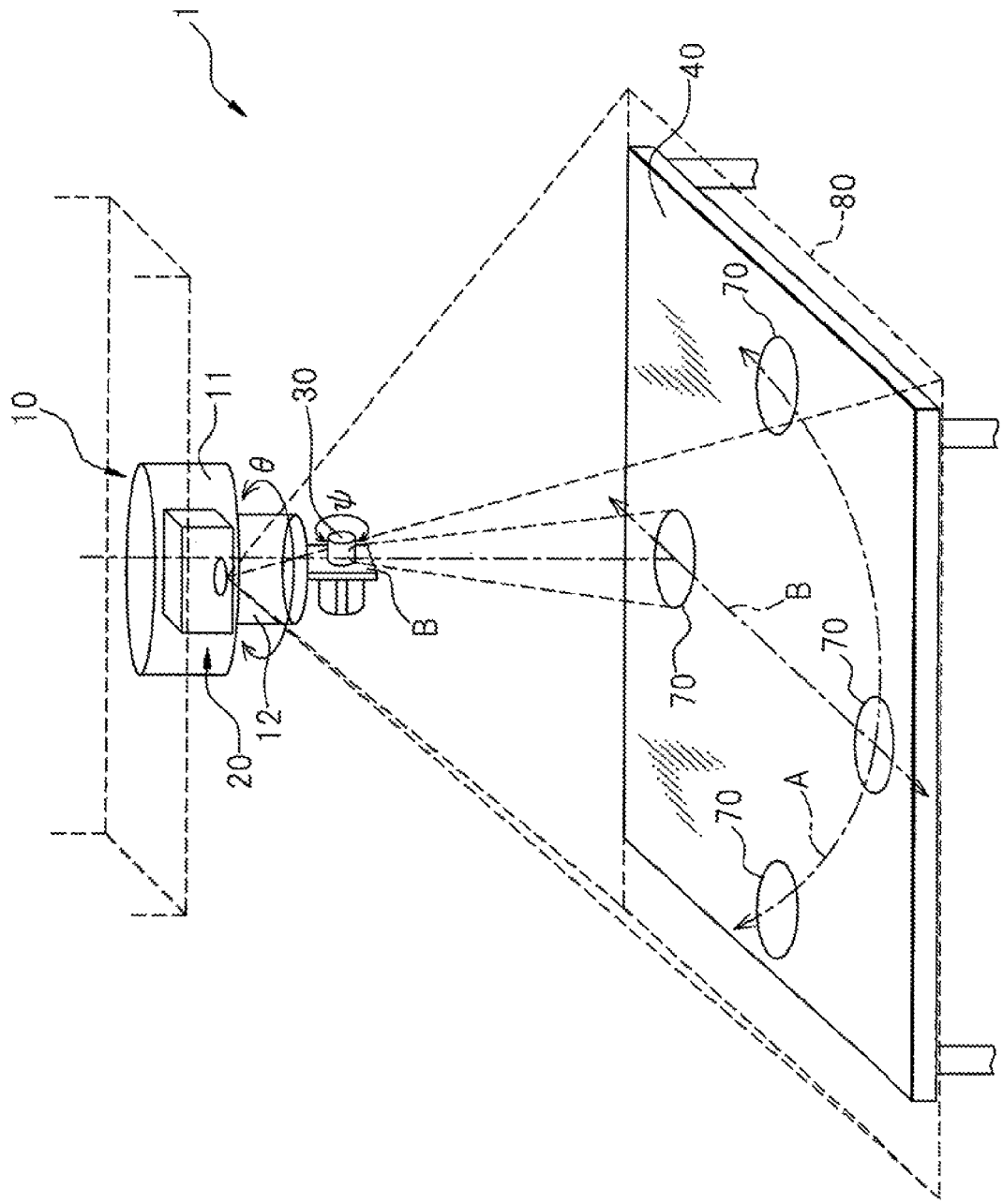
FIG. 1 is a perspective view showing the external appearance of an information input apparatus 1.

An information input apparatus will be described below with reference to drawings. It will, however, be noted that the technical scope of the present invention is not limited by any particular embodiment described herein but extends to the inventions described in the appended claims and their equivalents. Further, in the description of the drawings, the same or corresponding component elements are designated by the same reference numerals, and the description of such component elements, once given, will not be repeated thereafter. It will also be noted that the scale of component members is changed as necessary for illustrative purposes.

Figure 2:
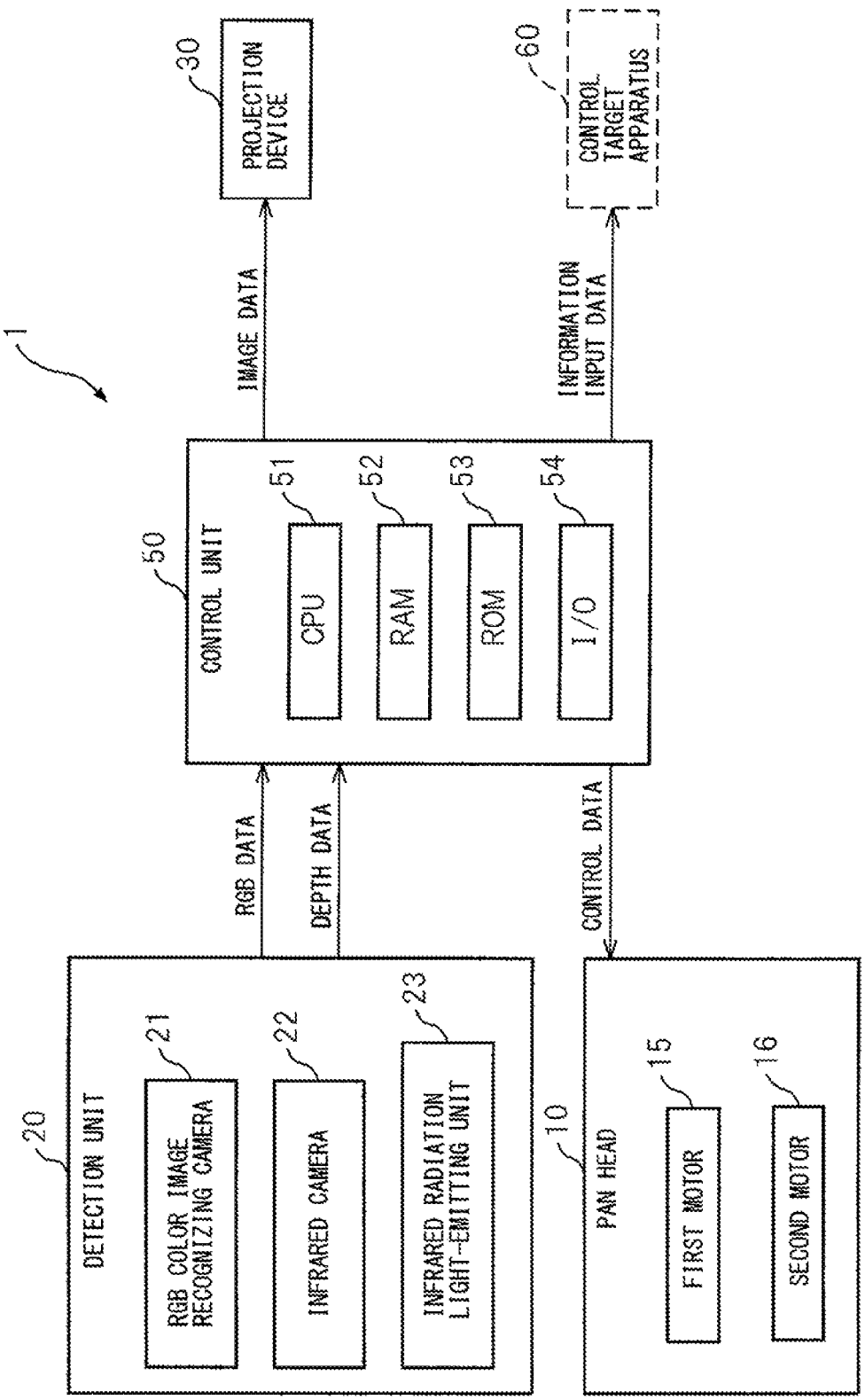
FIG. 2 is a schematic block diagram showing the configuration of the information input apparatus 1.

FIG. 1 is a perspective view showing the external appearance of an information input apparatus 1, and FIG. 2 is a schematic block diagram showing the configuration of the information input apparatus 1.

The information input apparatus 1 comprises a pan head 10, a detection unit 20, a projection device 30, and a control unit 50.

The pan head 10 is fixed to a mounting frame not shown, and comprises a base 11, a first rotating part 12 which is rotated in direction θ by a first motor 15, and a second rotating part 13 which is rotated in direction φ by a second motor 16.

The detection unit 20 is also fixed to the mounting frame not shown, and comprises an RGB color image recognizing camera 21, an infrared camera 22, and an infrared radiation light-emitting unit 23. The RGB color image recognizing camera 21 captures an image within a detection range 80, and outputs position coordinate data and RGB data for each pixel of the captured image. The infrared camera 22 receives light reflected from an object located within the recognition range 80, the reflected light being a reflection of infrared light radiated from the infrared radiation light-emitting unit 23, and outputs position coordinate data and depth data (data corresponding to the distance between the infrared camera 22 and the target pixel) for each pixel of the captured image. It is assumed here that the RGB color image recognizing camera 21 and the infrared camera 22 have the same detection range 80 and the same resolution.

The projection device 30 is constructed from an ultra-compact projector using RGB color lasers, one for each of the RGB colors, and is mounted to the second rotating part 13 of the pan head 10. Based on the image data received from the control unit 50, the projection device 30 projects an information input image 70, an image produced for information input, onto the upper surface of a table 40 which serves as the projection surface. Any suitable projection device other than the ultra-compact projector using the RGB color lasers may be used, as long as it is designed to be capable of projecting a prescribed information input image.

In the example of FIG. 1, the upper surface of the table 40 is used as the projection surface, but any other suitable member, such as a floor, a wall, or a board, may be used as long as it can be touched with a user's fingertip and can be used as a surface on which the prescribed information input image can be projected.

The control unit 50 comprises a CPU 51, a RAM 52, a ROM 53, and an I/O 54 for transferring data to and from the pan head 10, the detection unit 20, the projection device 30, and a control target apparatus 60. The control unit 50 detects that the information input image 70 projected on the table 40 by the projection device 30 has been touched with a fingertip, and performs such processing as outputting the resulting information input data to the control target apparatus 60.

The control unit 50 controls the first and second motors 15 and 16 in accordance with control data so that the information input image 70 can be projected at the desired position on the upper surface of the table 40. The control unit 50 may include other recording media such as a hard disk. When the control unit 50 rotates the first rotating part 12 in the direction θ by controlling the first motor 15, the information input image 70 moves in the direction indicated by arrow A. When the control unit 50 rotates the second rotating part 13 in the direction φ by controlling the second motor 16, the information input image 70 moves in the direction indicated by arrow B.

The control target apparatus 60, which may be a television receiver, a radio receiver, or a recording and reproduction apparatus of a recording medium such as a CD, a DVD, or a Blu-ray disc, performs various kinds of processing based on the information input data.

Figure 3:
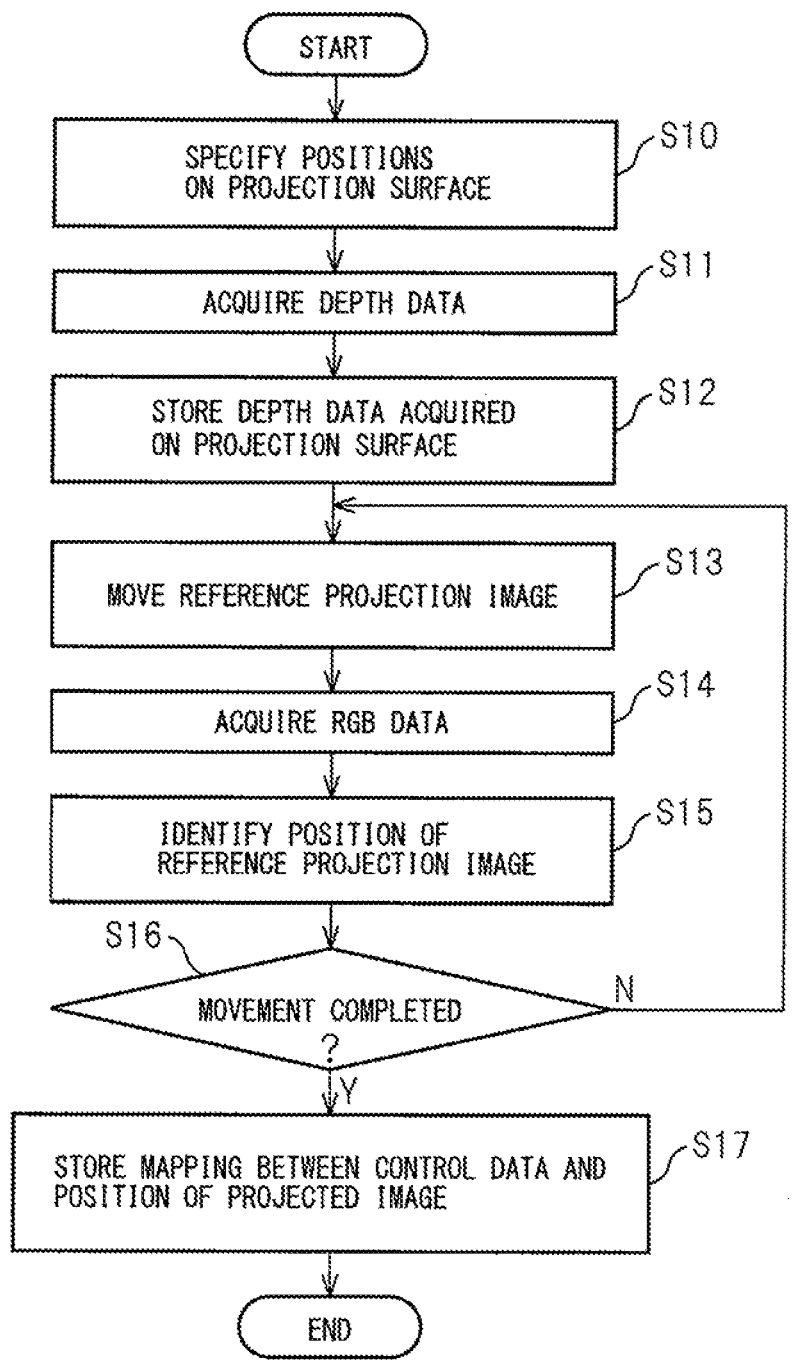
FIG. 3 is a diagram showing one example of a control flow for initial settings in the information input apparatus 1.

FIG. 3 is a diagram showing one example of a control flow for initial settings in the information input apparatus 1.

The CPU 51 of the control unit 50 executes the control flow of FIG. 3 by controlling the pan head 10, the detection unit 20, and the projection device 30 in accordance with a program prestored in the ROM 53 of the control unit 50.

A display and an operation unit (keyboard and mouse) not shown are connected to the control unit 50 via the I/O 54, and an image based on the RGB data supplied from the detection unit 20 is produced on the display; in this condition, the user specifies positions on the projection surface by using the operation unit (S10). The position coordinate data indicating the range of the specified projection surface is stored in the RAM 52, etc.

Figure 4:
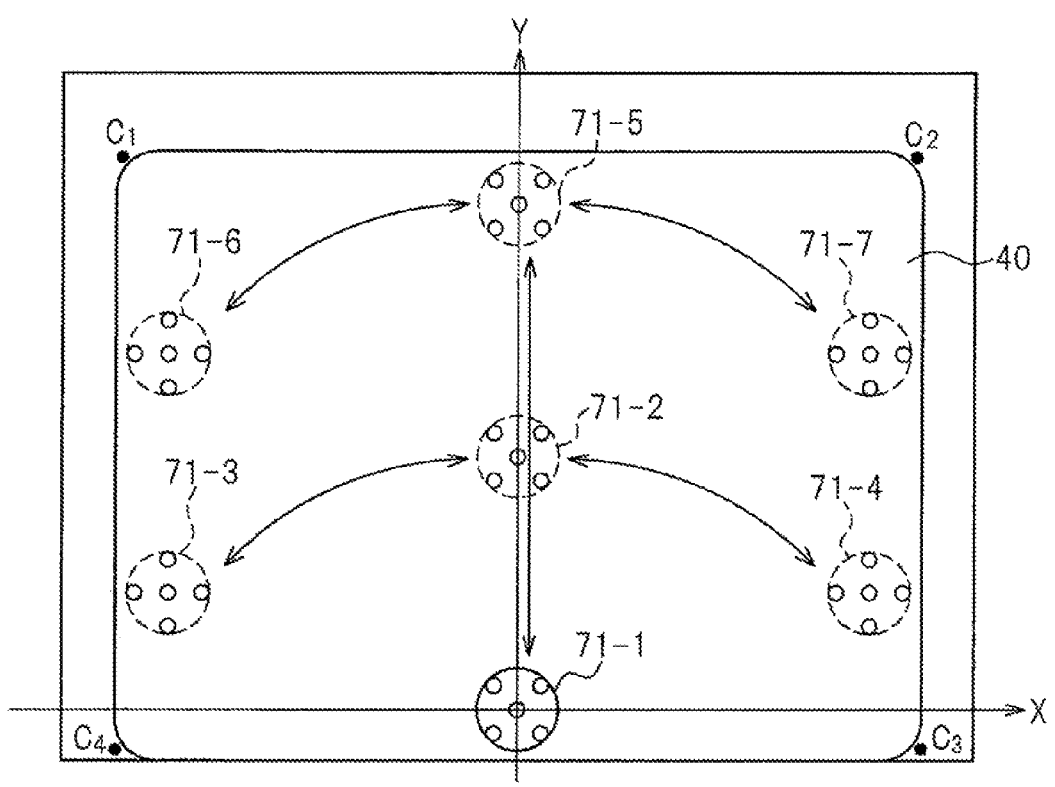
FIG. 4 is a diagram showing one example of an image captured by an RGB color image recognizing camera 21 and produced on a display.

FIG. 4 is a diagram showing one example of the image produced on the display based on the RGB data supplied from the detection unit 20. For example, by specifying four points C1 to C4 in FIG. 4, the table 40 is specified as the projection surface. If the difference between the projection surface and the background is distinctly identifiable, the control unit 50 may be configured to automatically specify the projection surface by using known image processing techniques. If the entire area captured by the detection unit 20 is used as the projection surface, this step (S10) may be omitted.

Next, the control unit 50 acquires the depth data from the detection unit 20 (S11), and stores the depth data in the RAM 52 for each pixel contained in the area specified as the projection surface (S12).

Figure 5:
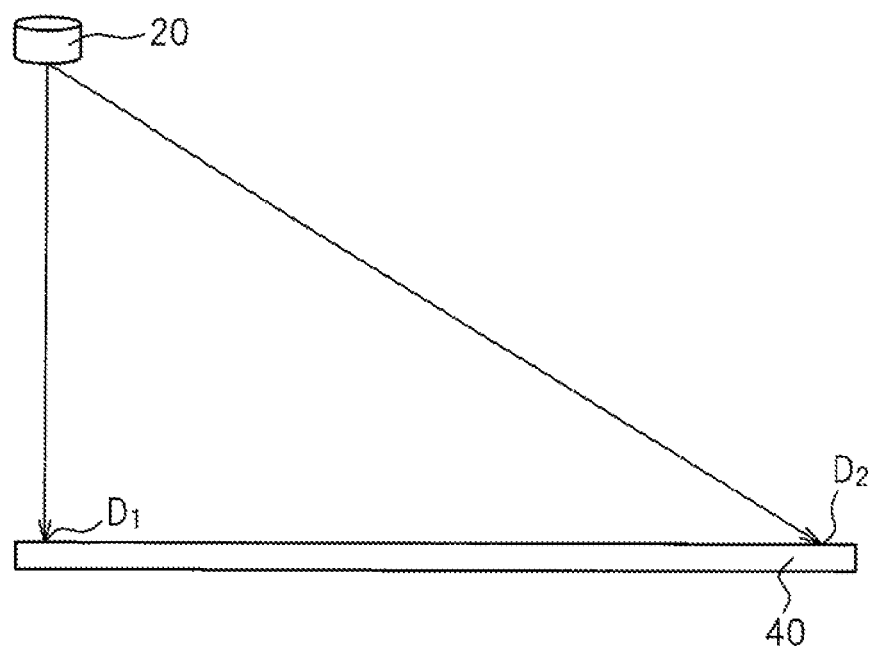
FIG. 5 is a diagram for explaining depth data on a projection surface.

FIG. 5 is a diagram for explaining the depth data on the projection surface. As shown in FIG. 5, the point D1 on the table 40 that is located directly below the detection unit 20 and the point D2 on the table 40 that is located farther away from the detection unit 20 are on the same table 40, but there occurs a difference in the depth data acquired from the detection unit 20. In view of this, the position coordinate data and depth data for all the pixels on the projection surface are acquired and stored in advance.

Next, the control unit 50 transmits prescribed image data to the projection device 30 to project a reference projection image 71 on the projection surface, and transmits prescribed control data to the pan head 10 to move the reference projection image 71 by controlling the pan head 10 (S13). The reference projection image 71 is one that contains five black dots displayed within a circular frame, as shown in FIG. 4. The reference projection image 71 shown in FIG. 4 is one example, and any other suitable image may be used. The reference projection image 71-1 in FIG. 4 is projected at the reference position in the illustrated example located directly below the pan head 10. The positional relationship between the pan head 10 and the projection surface and the reference position of the projected image can be determined suitably according to the situation.

Next, the control unit 50 acquires the position coordinate data and RGB data from the detection unit 20 (S14).

Then, using the five black dots, the control unit 50 identifies the position of the reference projection image 71, and stores a mapping between the control data transmitted to the pan head 10 and the position coordinate data of the identified reference projection image 71 in a data table constructed within the RAM 52 (S15).

The control unit 50 repeats the above steps S13 to S15 while moving the reference projection image at predetermined increments so as to cover the entire area of the projection surface (S16). In FIG. 4, reference projection images 71-2 to 71-7 are shown, but these are for illustrative purposes, and the amount by which the reference projection image is moved in one operation in order to identify the position can be suitably determined.

By repeating the steps S13 to S15 a prescribed number of times, the control unit 50 completes the construction of the data table that provides a mapping between the control data and the position coordinate data of the projected image for the entire area of the projection surface (S17). Using the data table, the control unit 50 can move the projected image to the desired position on the specified projection surface by controlling the pan head 10. Conversely, the control unit 50 can identify the position of the currently projected image on the projection surface by using the data table.

Figure 6A:
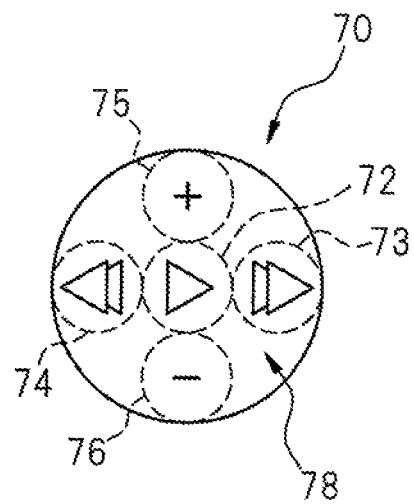
FIG. 6(a) is a diagram showing one example of an information input image that a projection device 30 projects.
Figure 6B:
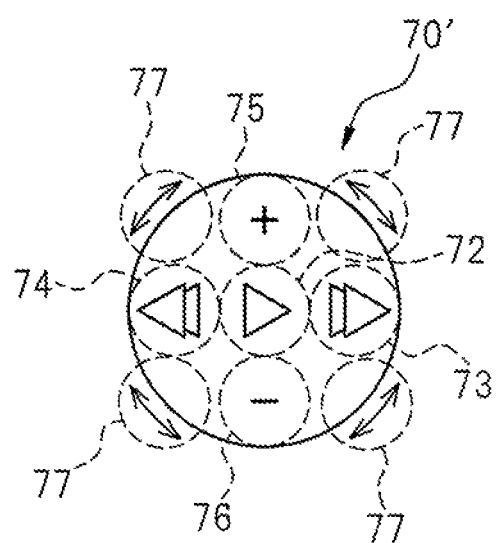
FIG. 6(b) is a diagram showing another example of an information input image that the projection device 30 projects.

FIG. 6 is a diagram showing examples of the information input image that the projection device 30 projects. The information input image 70 shown in FIG. 6(*a*) contains a video playback button 72, a fast forward button 73, a rewind button 74, a channel UP button 75, and a channel DOWN button 76. When the fingertip is located, as will be described later, in a selected one of the regions enclosed by dashed lines, it is determined that an information input corresponding to the selected button has been done. FIG. 6(*b*) shows an information input image 70' as another example. This other information input image 70' contains, in addition to the buttons shown in FIG. 6(*a*), a rotation button 77 for rotating the information input image 70'. The information input images shown in FIG. 6 are only examples, and the projection device 30 can project various kinds of information input images based on the image data supplied from the control unit 50.

Based on the image data to be transmitted to the projection device 30, the control unit 50 can identity the kinds of the input buttons contained in the information input image and the positions of the buttons on the information input image. Further, the control unit 50 can identity the position of the information input image on the projection surface, based on the data table constructed in S17 of FIG. 3 and the control data transmitted to the pan head 10. Accordingly, the control unit can identity the position of each button on the projection surface, based on the image data to be transmitted to the projection device 30 and the control data transmitted to the pan head 10.

FIG. 7 is a diagram showing one example of a control flow of the information input apparatus.

The CPU 51 of the control unit 50 executes the control flow of FIG. 7 by controlling the pan head 10, the detection unit 20, and the projection device 30 in accordance with a program prestored in the ROM 53 of the control unit 50.

First, the control unit 50 acquires the image data to be transmitted to the projection device 50 and the control data transmitted to the pan head 10 (S20). Next, the control unit 50 acquires the RGB data and depth data from the detection unit 20 (S21). The order of S20 and S21 may be interchanged.

Next, based on the RGB data acquired in S21, the control unit 50 identifies regions containing pixels of skin-tone colors (S22).

Then, based on the depth data acquired in S21, the control unit 50 organizes the regions containing pixels of skin-tone colors into groups of skin-tone regions, each group comprising pixels having substantially the same depth data (S23). The control unit 50 converts the RGB data acquired from the detection unit 20 into HSV data comprising hue (H: 0 to 360°), saturation (S: 0 to 255), and value (V: 0 to 255), and recognizes any pixel whose H is in the range of 0 to 30°, whose S is in the range of 80 to 255, and whose V is in the range of 0 to 255 as being a skin-tone pixel. These values of H, S, and V used to judge skin tones are only examples, and other suitable values may be used.

Figure 8:
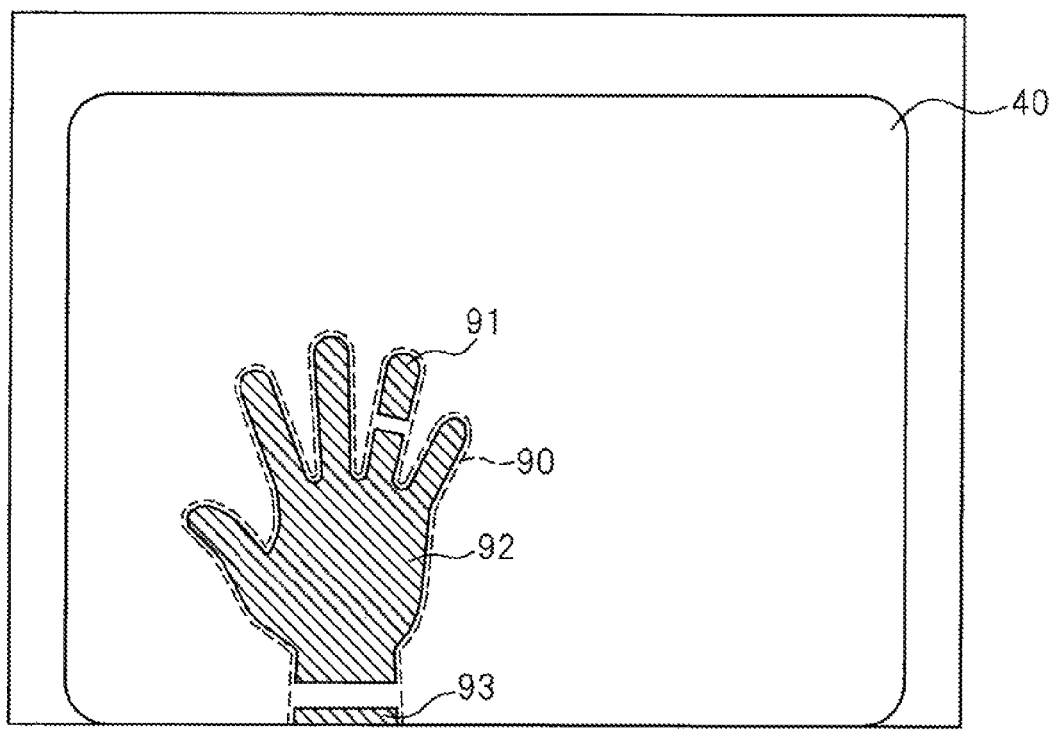
FIG. 8 is a diagram showing, by way of example, skin-tone regions 90 to 92 identified by a control unit 50.

FIG. 8 is a diagram showing, by way of example, three skin-tone regions 91 to 93 identified by the control unit 50. FIG. 8 shows the condition in which the user's right hand has intruded into the area of the projection surface in S22; here, the three skin-tone regions have been detected, because the ring worn on the user's fourth finger and the watch worn around the user's wrist are not skin toned. Then, the control unit 50 detects the region of the intruding object 90 by calculating the difference between the depth data on the projection surface stored in S12 and the depth data acquired in S21 and by extracting pixels for which the difference lies within a predetermined range (for example, within 10 mm). Next, the control unit 50 determines that the three skin-tone regions 91 to 93 located within the detected region of the intruding object 90 belong to the same group (S23). With the process of S22 and S23, it becomes possible to accurately recognize the user's body part forward of the wrist even when the user is wearing an accessory such as a ring or a wrist watch or holding something in his hand.

Next, based on the intruding object on which grouping is done in S23, the control unit 50 identifies the positions at which the intruding object has intruded into the projection surface and the position of the fingertip (S24).

Figure 9:
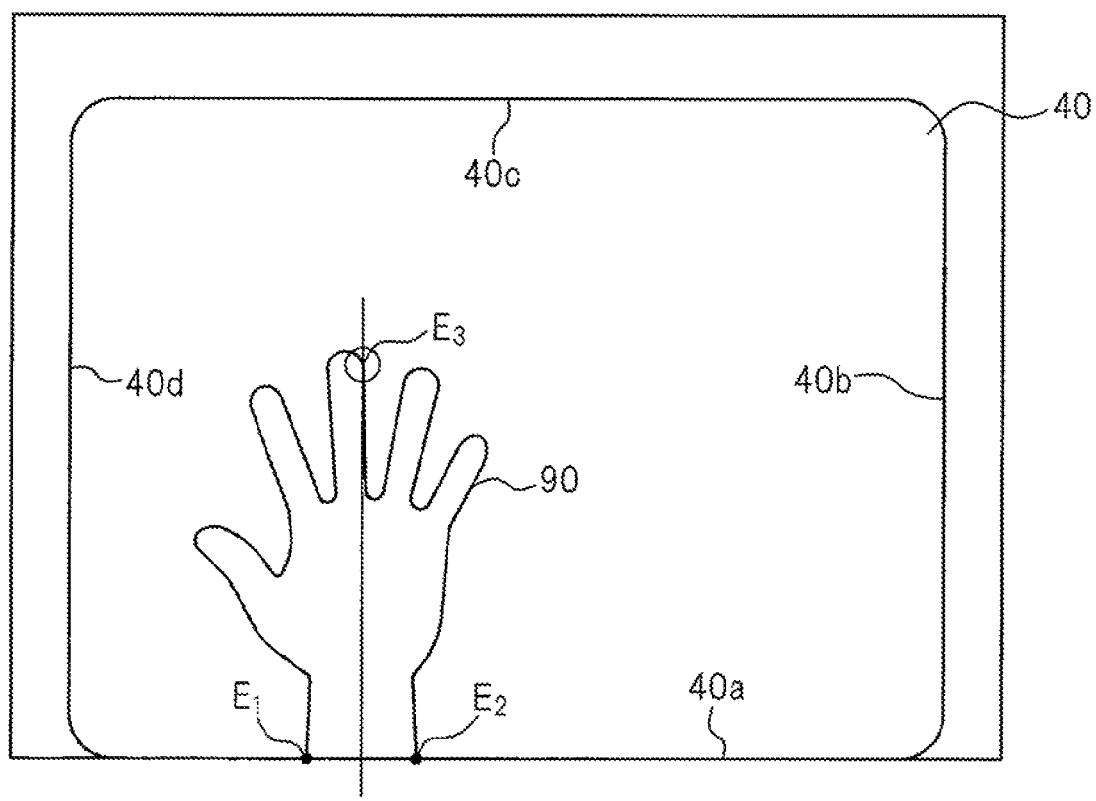
FIG. 9 is a diagram showing one example of an intruding object 90 on which grouping is done by the control unit 50.

FIG. 9 is a diagram showing one example of the intruding object 90 on which grouping is done by the control unit 50. The control unit 50 identifies the intruding positions E1 and E2 by determining that the intruding object 90 has intruded into the area of the projection surface from one side 40a of the projection surface. The intruding positions E1 and E2 correspond to the points at which the intruding object 90 contacts the one side 40a of the projection surface. Next, the control unit 50 identifies the position of the fingertip by detecting the point E3 at which the straight line drawn perpendicular to the midpoint between the intruding positions E1 and E2 on the one side 40a of the projection surface crosses the skin-tone region of the intruding object 90 at the position farthest from the one side 40a of the projection surface.

Alternatively, the skin-tone region of the intruding object 90 located at the position farthest from the one side 40a of the projection surface in the direction perpendicular to the one side 40a of the projection surface at the midpoint between the intruding positions E1 and E2 may be identified as the position of the fingertip. The above method of identifying the position of the fingertip based on the intruding positions is only one example, and the position of the fingertip may be identified by some other suitable method that uses the intruding positions E1 and E2.

Next, the control unit 50 determines whether the intruding object 90 is performing an information input operation (S25). If the intruding object exists within the detection range 80 of the detection unit 20, the object may have merely entered the detection range without any intention of performing an information input operation. Therefore, in the control flow, if the fingertip is located on the projection surface, then it is determined that the fingertip E3 of the intruding object 90 is performing an information input operation. Whether the fingertip is located on the projection surface or not is determined based on whether the difference between the depth data on the projection surface acquired in advance in S12 of FIG. 13 and the depth data of the fingertip position lies within a prescribed threshold value (for example, within 10 mm). That is, if the difference between the depth data of the fingertip position E3 and the depth data on the projection surface at the position coordinates representing the fingertip position E3 lies within the prescribed threshold value, the control unit 50 determines that the fingertip at position E3 is intended for an information input operation.

The depth data of the fingertip position E3 may fluctuate over a short period of time because of chattering, etc. Accordingly, in order to prevent an erroneous detection, it may be determined that an information input is done only when the difference between the depth data of the fingertip position E3 and the depth data on the projection surface at the position coordinates representing the fingertip position E3 has remained within the prescribed threshold value continuously for a predetermined length of time (for example, one second or longer).

If it is determined in S25 that the fingertip at position E3 is intended for an information input operation, the control unit 50 identifies the input button position on the projection surface for each input button contained in the information input image 70, based on the image data transmitted to the projection device 30 and the control data transmitted to the pan head 10 (S26).

Next, the control unit 50 identifies the kind of the information input operation, based on the fingertip position E3 identified in S24 and the position of each input button on the projection surface identified in S26 (S27). For example, if the coordinates of the fingertip position E3 lie within the range of the playback button 72 shown in FIG. 6(a), the control unit 50 determines that the operation indicated by the information input is "playback". If there is no input button that matches the position coordinate data of the fingertip position E3, it may be determined that there is no information input, or it may be determined that some other information input (for example, for moving the position of the information input image) has been done as will be described later.

Next, the control unit 50 performs processing corresponding to the kind of the information input operation identified in S27 (S28), and then terminates the sequence of operations. For example, if the operation indicated by the identified information input is "playback", the control unit 50 sends a "playback" signal to the control target apparatus 60 connected to it. If it is determined in S25 that there is no information input, the sequence of operations is also terminated. The control unit 50 carries out the control flow of FIG. 7 repeatedly at predetermined intervals of time.

By repeatedly carrying out the control flow of FIG. 7, it becomes possible for the user to perform an information input for "playback" without using an apparatus such as a remote control but by just touching his fingertip to the desired input button (for example, the playback button 72) contained in the information input image 70 projected on the projection surface.

Other examples of the information input performed in the information input apparatus 1 will be described with reference to FIGS. 10 to 12.

Figure 10:
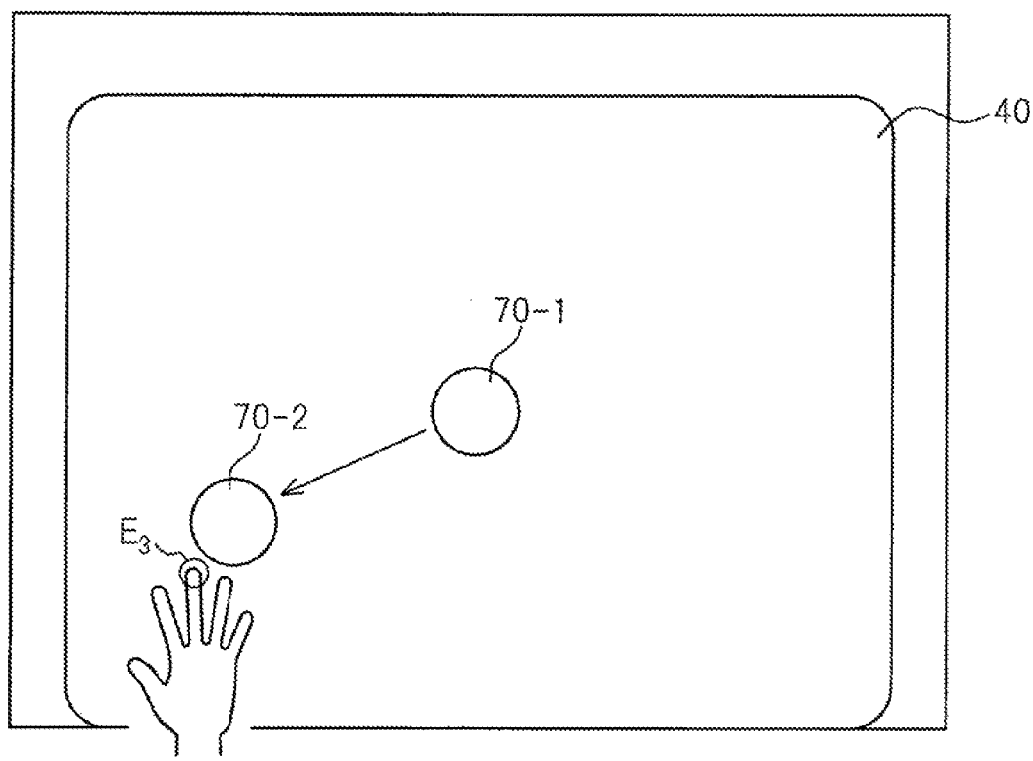
FIG. 10 is a diagram showing another example of the information input performed in the information input apparatus 1.

In the example of FIG. 10, when the information input image is located in a standby position (70-1), if the user touches a desired position on the projection surface with his fingertip, the information input image moves to the desired position (70-2), making it easier to perform the next information input operation. That is, when the user's fingertip is detected, the information input apparatus 1 moves the information input image 70 so as to follow the fingertip.

For example, in S27 of FIG. 7, if there is no input button corresponding to the fingertip position E3, the control unit 50 determines that a move instruction such as shown in FIG. 10 has been input, and performs control to move the information input image 70 toward the fingertip position E3 by controlling the pan head 10. To discriminate this particular information input from other information inputs, provisions may be made to determine that an instruction for moving the information input image, such shown in FIG. 10, has been input, only when the user touches the projection surface with his fingertip two or more times within a short interval (for example, within one second).

Figure 11:
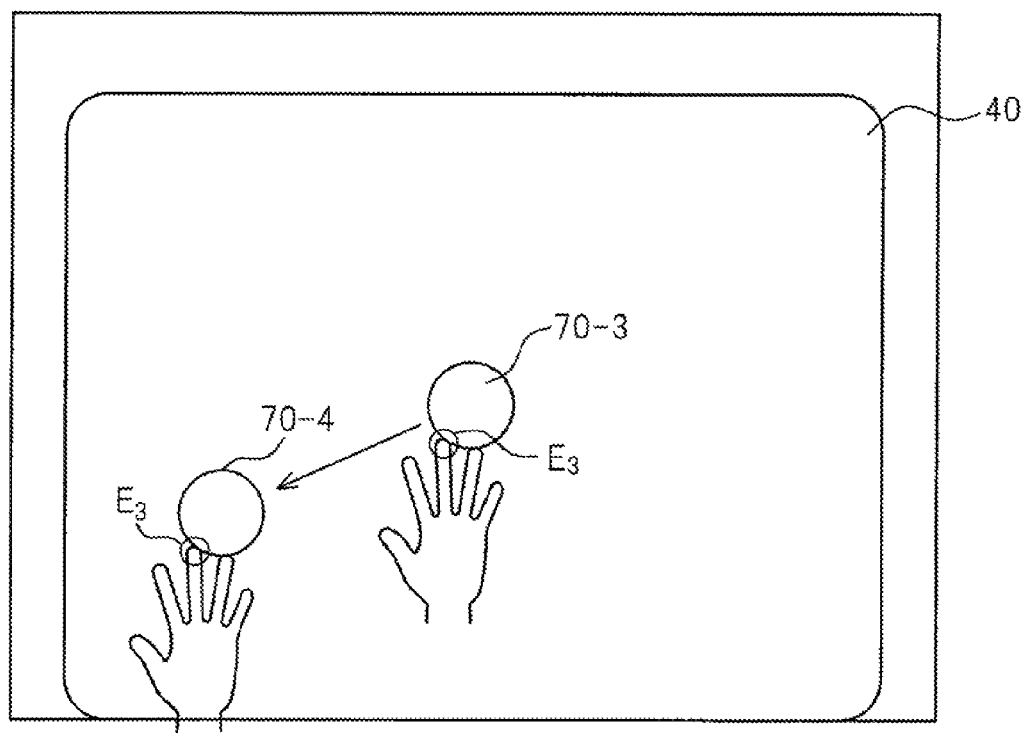
FIG. 11 is a diagram showing still another example of the information input performed in the information input apparatus 1.

In the example of FIG. 11, when the information input image is located in a standby position (70-3), the user gets hold of the information input image by placing his fingertip on a region (for example, region 78 in FIG. 6(*a*)) other than the input button regions in the information input image, and drags the image to a closer position (70-4).

For example, in S27 of FIG. 7, if there is no input button corresponding to the fingertip position E3, but the fingertip position E3 is located within the region of the information input image 70, it is determined that a move instruction such as shown in FIG. 11 has been input. Accordingly, the control unit 50 detects the fingertip position E3 at predetermined intervals of time (for example, every 100 ms), and performs control to move the information input image 70 to the detected fingertip position E3. To discriminate this particular information input from other information inputs, provisions may be made to determine that an instruction for moving the information input image, such shown in FIG. 11, has been input, only when the user keeps touching the projection surface with his fingertip for a predetermined length of time (for example, two seconds) or longer.

Figure 12:
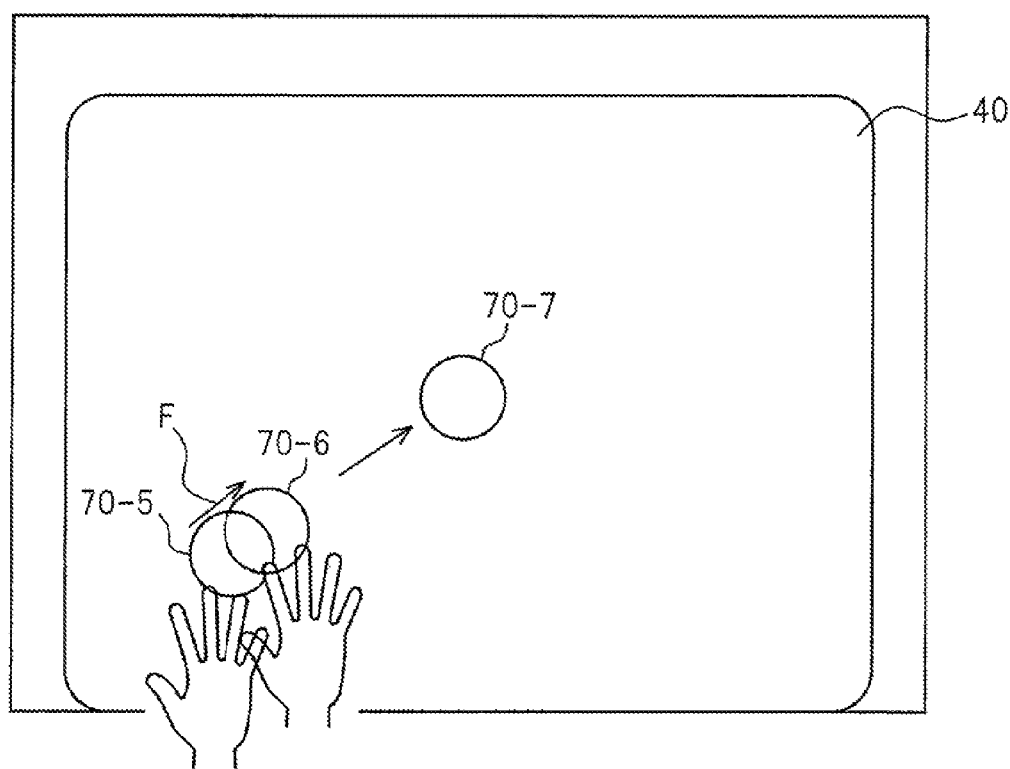
FIG. 12 is a diagram showing yet another example of the information input performed in the information input apparatus 1.

In the example of FIG. 12, when the information input image is located in a given position (70-5), the user places his fingertip on a region (for example, region 78 in FIG. 6(*a*)) other than the input button regions in the information input image, and slowly drags his fingertip in the direction of arrow F. In this case, the information input image moves to a position (70-7) located at a prescribed distance away in the direction of arrow F.

The above case corresponds, for example, to the case where, while there is no input button corresponding to the fingertip position E3 in S27 of FIG. 7, the fingertip position E3 is located within the region of the information input image 70 and detected at different positions (70-5 and 70-6) at different times within a predetermined period of time. In this case, the control unit 50 calculates the direction F from these positions, and performs control to move the information input image by a prescribed distance in the direction F.

Figure 13A:
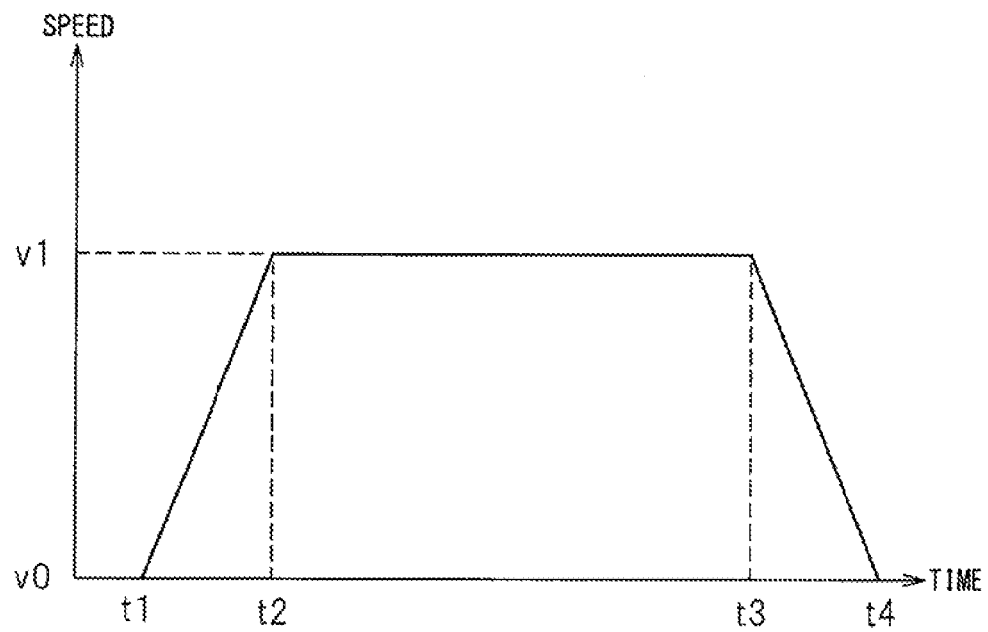
FIG. 13(a) is a diagram for explaining one example of how the movement of the information input image is controlled in the information input apparatus 1.
Figure 13B:
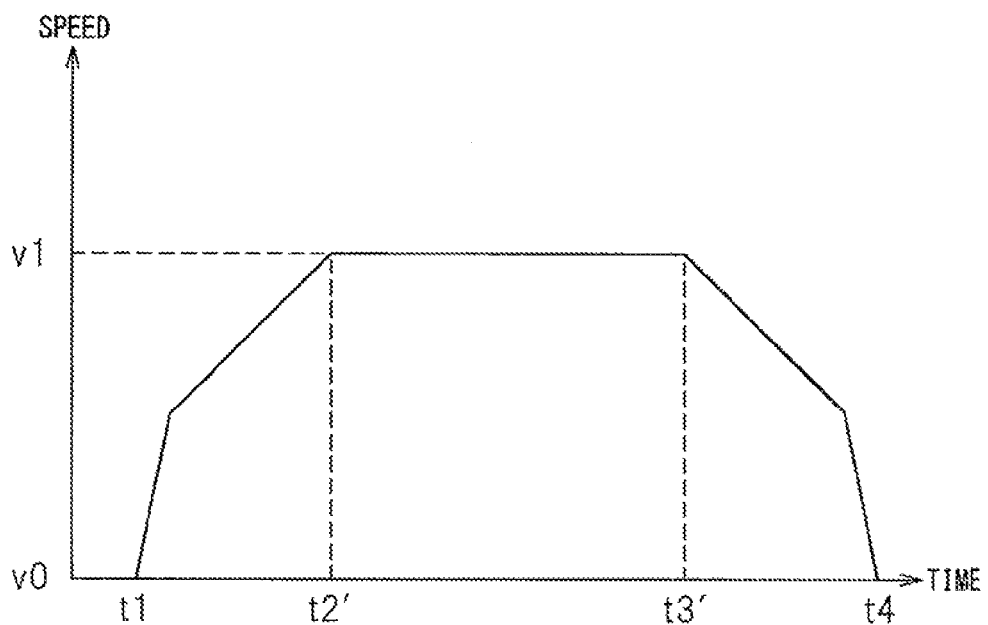
FIG. 13(b) is a diagram for explaining another example of how the movement of the information input image is controlled in the information input apparatus 1.

FIG. 13 is a diagram for explaining how the movement of the information input image is controlled in the information input apparatus 1.

FIG. 13(*a*) shows the moving speed as a function of time, for example, when the information input image in FIG. 10 moves from 70-1 at time t1 to 70-2 at time t4. In the example of FIG. 13(*a*), the control unit 50 performs control so that the motor in the pan head 10 is first driven at a prescribed acceleration rate during the period from time t1 to time t2, then driven at a constant speed v1, and finally driven at a prescribed deceleration rate during the period from time t3 to time t4. The information input image is thus moved until reaching the position 70-2 at time t4.

When the information input image is moved as shown in FIG. 3(*a*), the speed abruptly changes at time t2 and then at time t3, which does not give the impression that the information input image is moving smoothly. In view of this, in the example of FIG. 13(*b*), control is performed to increase the speed in two steps during the period from time t1 to time t2' and decrease the speed in two steps during the period from time t3' to time t4 so that the user can be given the impression that the information input image is moving smoothly. The movement control methods of FIGS. 13(*a*) and 13(*b*) can be used to move the projection position of the information input image under the control of the control unit 50.

Figure 14A:
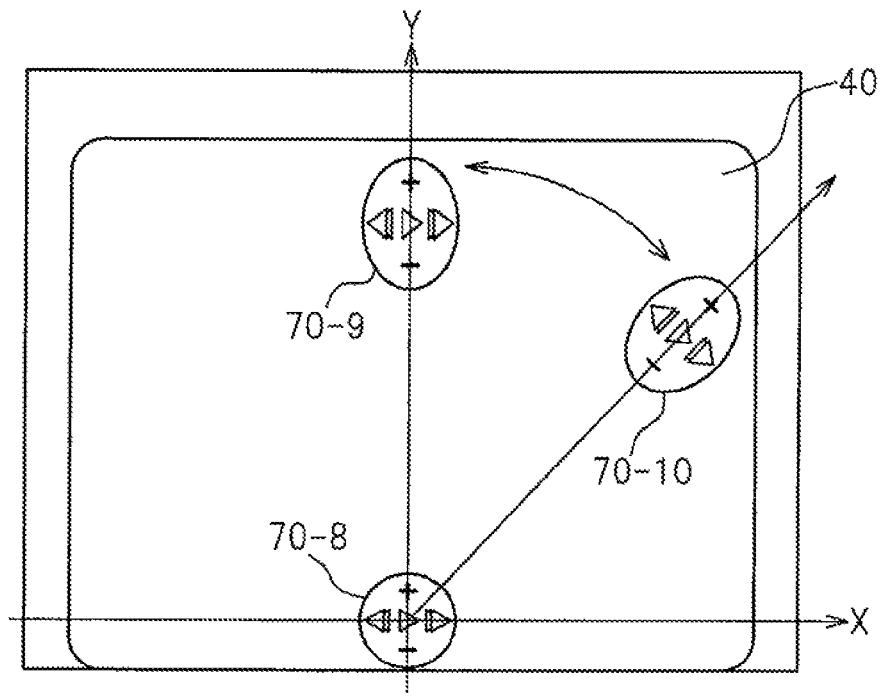
FIG. 14(a) is a diagram for explaining one example of image processing to be applied to a projected image in the information input apparatus 1.
Figure 14B:
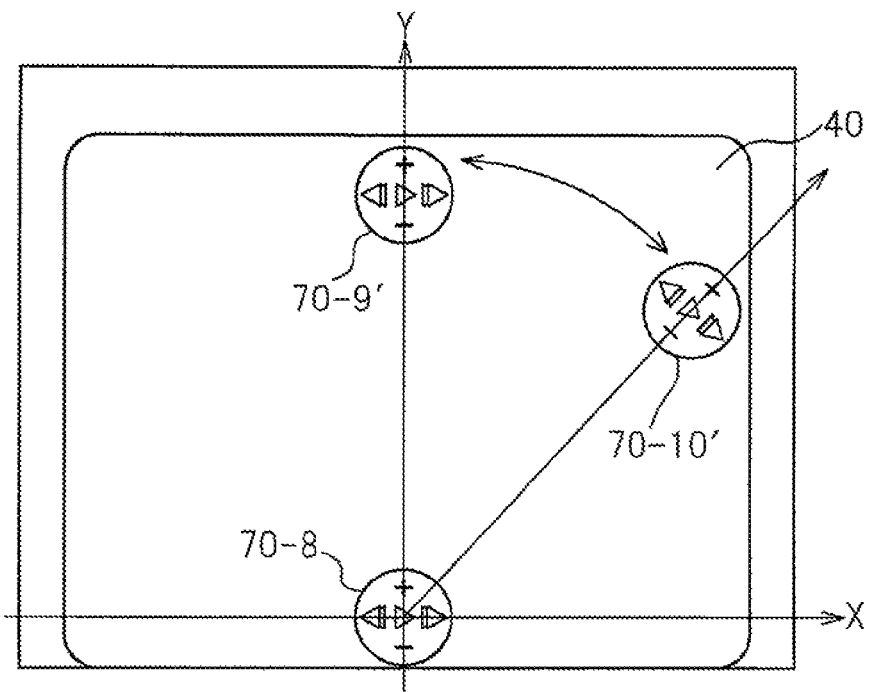
FIG. 14(b) is a diagram for explaining another example of image processing to be applied to the projected image in the information input apparatus 1.

FIG. 14 is a diagram for explaining image processing to be applied to the projected image in the information input apparatus 1.

In the example of FIG. 1, the position of the projection device 30 is fixed, and the surface of the table 40 is flat; therefore, as shown in FIG. 14(*a*), the projected image (70-9) when the pan head is moved in the direction φ and the projected image (70-10) when the pan head is moved in the direction θ and then in the direction φ are both distorted as compared with the projected image (70-8) formed directly below the projection device 30.

In view of this, if the original image to be projected is predistorted by applying known image processing techniques to the image data supplied from the control unit 50, a projected image substantially free from distortion can be formed anywhere on the projection surface, as exemplified by the projected images 70-9' and 70-10' in FIG. 14(*b*).

Figure 15:
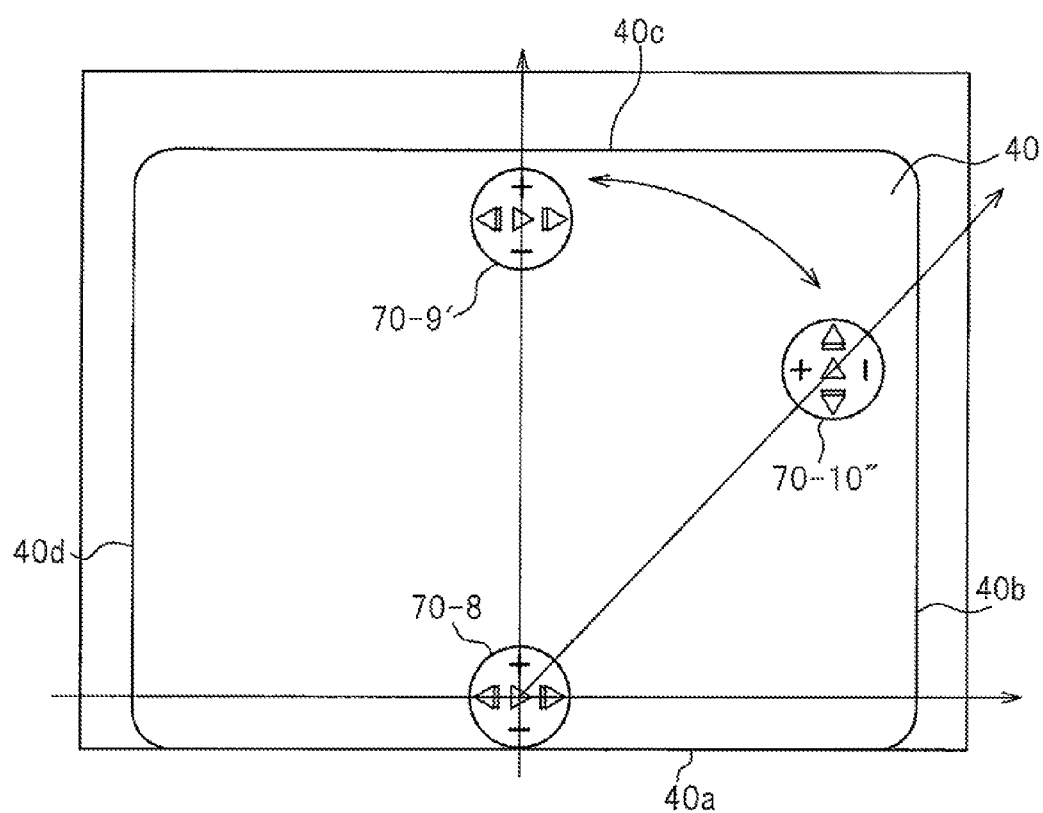
FIG. 15 is a diagram for explaining rotation processing to be applied to the projected image in the information input apparatus 1.
Figure 16:
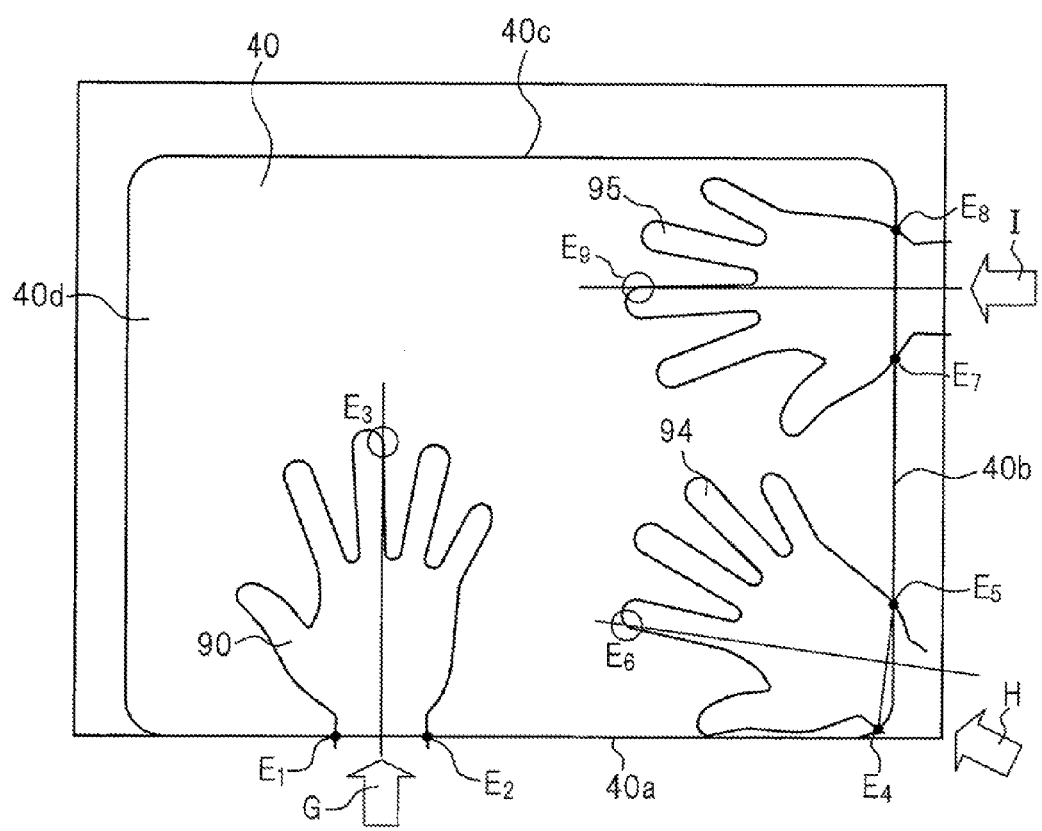
FIG. 16 is a diagram showing the intruding direction of an intruding object.

FIGS. 15 and 16 are diagrams for explaining rotation processing to be applied to the projected image in the information input apparatus 1.

If processing is applied so as to produce a distortion-free projected image, since the position of the projected image is moved by causing the pan head 10 to rotate the projection device 30, the orientation of the projected image changes depending on the position on the projection surface, as exemplified by the projected image 70-10' in FIG. 14(*b*). In view of this, provisions may be made so as to be able to change the orientation, as exemplified by the projected image 70-10" in FIG. 15. It is preferable to change the orientation so that the projected image is oriented in the correct direction as viewed from the direction in which the user's fingertip position has been detected.

FIG. 16 is a diagram showing the intruding direction of the intruding object. The intruding object 90 shown in FIG. 16 is the same as that shown in FIG. 9. The fingertip position E3 of the intruding object 90 is identified based on the points of contact, E1 and E2, with one side 40*a* of the table 40. Accordingly, when the fingertip position E3 is detected, the information input image is rotated so as to be oriented in the correct direction (see arrow G) as viewed from the one side 40*a*.

The fingertip position E6 of the intruding object 94 is identified based on the points of contact, E4 and E5, with the one side 40*a* and another side 40*b* of the table 40. Accordingly, when the fingertip position E6 is detected, the information input image is rotated so as to be oriented in the correct direction (see arrow H) as viewed from the corner between the one side 40*a* and that other side 40*b*.

Likewise, the fingertip position E9 of the intruding object 95 is identified based on the points of contact, E7 and E8, with one side 40*b* of the table 40. Accordingly, when the fingertip position E9 is detected, the information input image is rotated so as to be oriented in the correct direction (see arrow I) as viewed from the one side 40*b*. For the reason such as described above, the projected image 70-10" shown in FIG. 15 is rotated so as to be oriented in the correct direction as viewed from the one side 40*b*.

In the examples of FIGS. 15 and 16, the control unit 50 detects the intruding direction of the intruding object, and the image data is processed so that the projected image is oriented in the correct direction as viewed from a prescribed direction. However, an input button may be provided that allows the user to rotate the projected image in the desired direction that matches his needs. The information input image 70' shown in FIG. 6(*b*) contains the rotation control button 77. When the user touches the button 77 with his fingertip, the projected information input image 70' itself is rotated in the desired direction.

Figure 17:
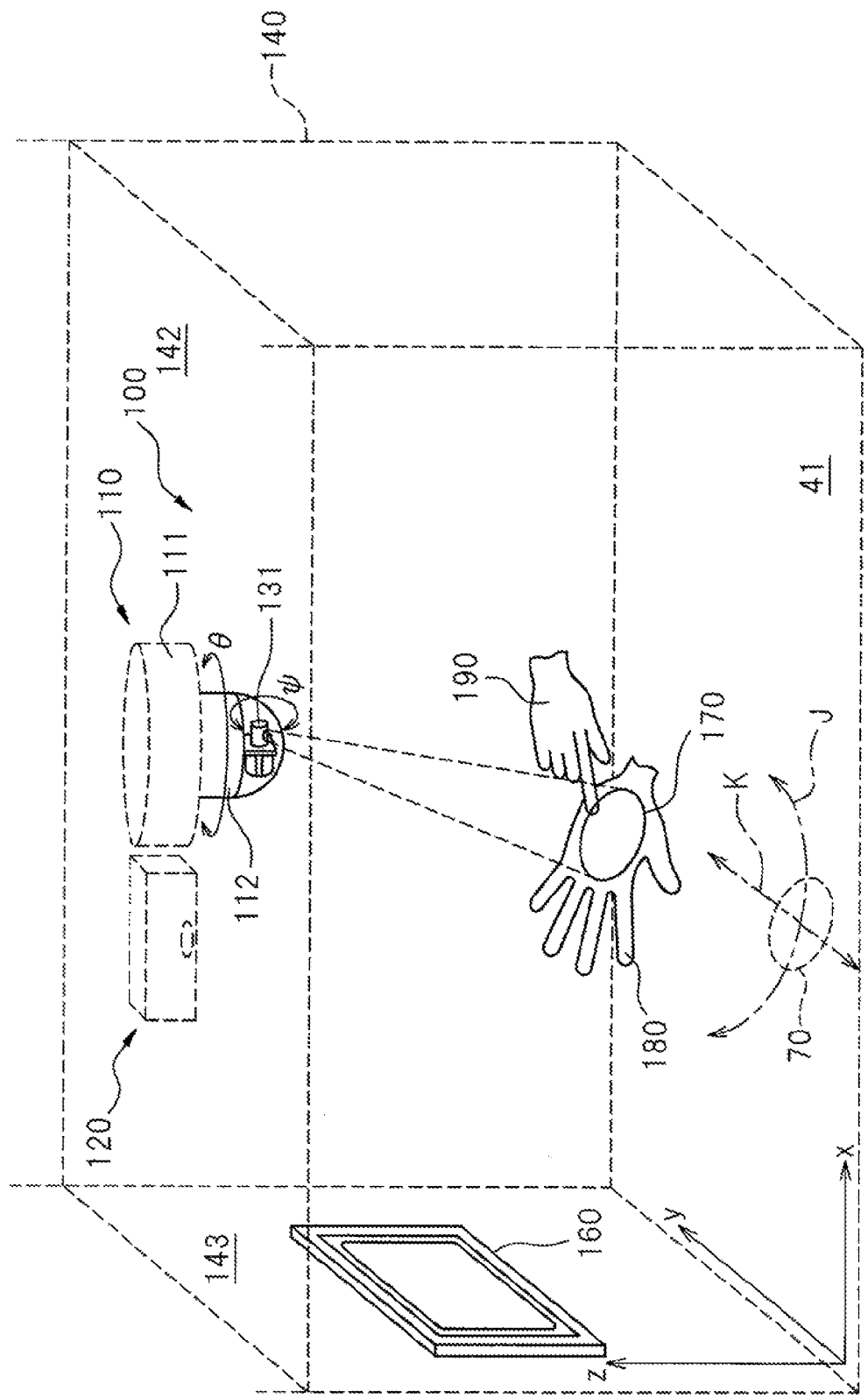
FIG. 17 is a perspective view showing the external appearance of an information input apparatus 100.
Figure 18:
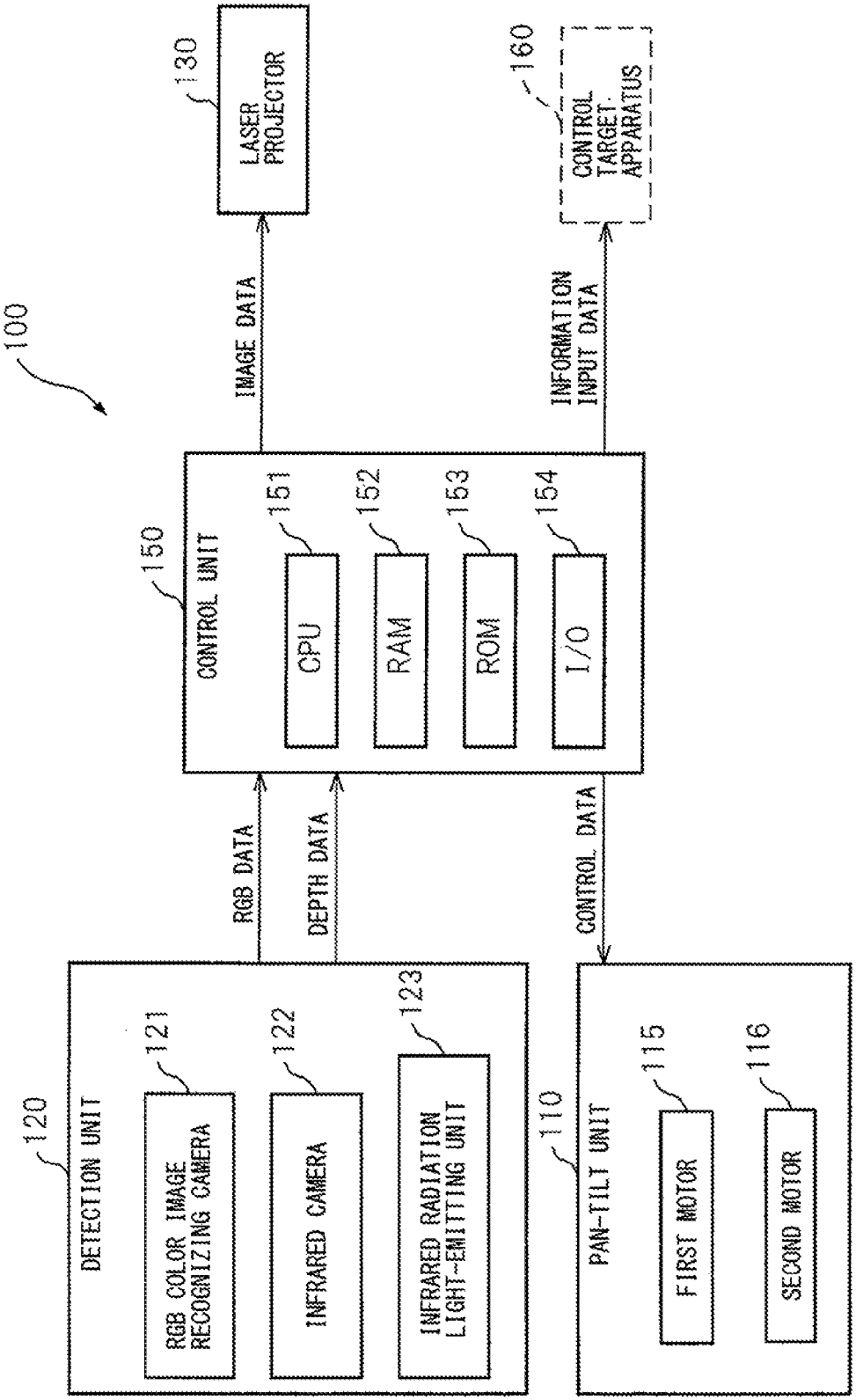
FIG. 18 is a schematic block diagram showing the configuration of the information input apparatus 100.

FIG. 17 is a perspective view showing the external appearance of an information input apparatus 100, and FIG. 18 is a schematic block diagram showing the configuration of the information input apparatus 100.

The information input apparatus 100 comprises a pan-tilt unit 110, a detection unit 120, a laser projector 130, and a control unit 150, and is placed in a space 140 enclosed at least by a floor 141, a ceiling 142, and walls 143. The space 140 may be a fully closed space or may be an open space. In FIG. 17, a wall-hanging liquid crystal TV with a video recording function as one example of a control target apparatus 160 is mounted on one wall 143.

The pan-tilt unit 110 is fixed to the ceiling 142, and comprises a base 111, a first rotating part 112 which is rotated in direction θ by a first motor 115, and a second rotating part 113 which is rotated in direction φ by a second motor 116.

The detection unit 120 is also fixed to the ceiling 120, and comprises an RGB color image recognizing camera 121, an infrared camera 122, and an infrared radiation light-emitting unit 123. The RGB color image recognizing camera 121 captures an image within the space 140, and outputs position coordinate data (x, y) and RGB data for each pixel of the captured image. The infrared camera 122 receives light reflected from an object located within the space 140 and from the members (floor, walls, etc.) constituting the space 140, the reflected light being a reflection of infrared light radiated from the infrared radiation light-emitting unit 123. The infrared camera 122 outputs position coordinate data (x, y) and depth data (r: data corresponding to the distance between the infrared camera 122 and the target pixel) for each pixel of the captured image. It is assumed here that the RGB color image recognizing camera 121 and the infrared camera 122 have the same detection range and the same resolution.

The laser projector 130 is constructed so that light from each of RGB color lasers is introduced through an optical fiber into an ultra-compact light emitting part 131, and the light emitting part 131 of the laser projector 130 is mounted to the second rotating part 113 of the pan-tilt unit 110. Based on the image data received from the control unit 150, the laser projector 130 projects an information input image 170 onto the palm of a user's hand. Since the light emitting part 131 is compact and light-weight, the projected image can be moved quickly without using a large driving unit. Furthermore, the laser projector 130, which projects an image by using laser light, has the characteristic that the image can be projected with a good focus on the projection surface regardless of the distance between the projection surface and the light emitting part 131 of the laser projector 130 (focus-free characteristic). Any suitable projection device other than the projector using the RGB color lasers may be used, as long as it is designed to be capable of projecting a prescribed information input image.

The light emitting part 131 is constructed using an LCOS (Liquid Crystal on Silicon) device as an SLM (Spatial Light Modulator). A further reduction in the size of the light emitting part 131 can be achieved if it is constructed as a fiber scanning-type light emitting part or a spot scanning-type light emitting part using a MEMS (Micro Electro Mechanical System) mirror.

In the example of FIG. 17, the palm of the user's left hand 180 (which corresponds to the intruding object to be described later) is used as the projection surface, but some other recognizable body part of the user can be used as the projection surface if such body part has a sufficient degree of flatness.

The control unit 150 comprises a CPU 151, a RAM 152, a ROM 153, and an I/O 154 for transferring data to and from the pan-tile unit 110, the detection unit 120, the laser projector 310, and the control target apparatus 160. The control unit 150 detects that the information input image 170 projected on the palm of the user's left hand 180 by the laser projector 130 has been touched with the fingertip of the user's right hand 190, and performs such processing as outputting the resulting information input data to the control target apparatus 160.

When the palm of the user's left hand 180 is detected, the control unit 150 controls the first and second motors 115 and 116 in accordance with control data so that the information input image 170 can be projected on the palm of the user's left hand 180. The control unit 150 may include other recording media such as a hard disk. When the control unit 150 rotates the first rotating part 112 in the direction θ by controlling the first motor 115, the information input image 170 moves in the direction indicated by arrow A. When the control unit 150 rotates the second rotating part 113 in the direction φ by controlling the second motor 116, the information input image 170 moves in the direction indicated by arrow B. That is, the control unit 150 functions as an information detection unit which changes the projection position of the information input image 170, an image produced for information input, by tracking the position of the palm of the user's hand to be detected, and which detects an information input to the information input image 170 based on the data supplied from the detection unit 120.

The control target apparatus 160, which may be an air-conditioner, a network access device, a PC, a television receiver, a radio receiver, or a recording and reproduction apparatus of a recording medium such as a CD, a DVD, or a Blu-ray disc, performs various kinds of processing based on the information input data. In the example of FIG. 17, a wall-hanging liquid crystal TV with a video recording function is used as the control target apparatus 160, as previously described. That is, the information input apparatus 100 has the function to serve as a user interface (UI) or a virtual controller for various kinds of apparatus that can be used within the space 140.

Figure 19:
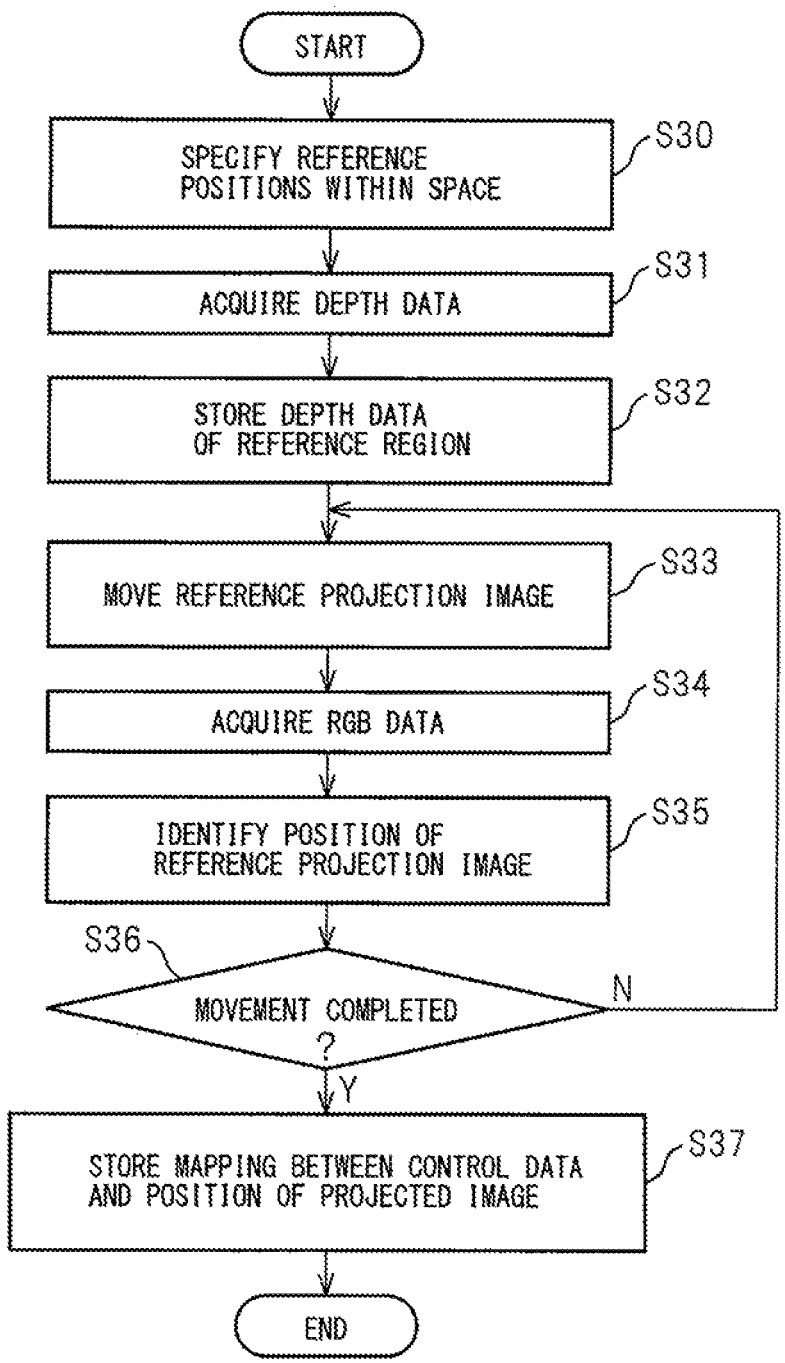
FIG. 19 is a diagram showing one example of a control flow for initial settings.

FIG. 19 is a diagram showing one example of a control flow for initial settings.

The CPU 151 of the control unit 150 executes the control flow of FIG. 19 by controlling the pan-tilt unit 110, the detection unit 120, and the laser projector 130 in accordance with a program prestored in the ROM 153 of the control unit 150.

A display and an operation unit (keyboard and mouse) not shown are connected to the control unit 150 via the I/O 154, and an image based on the RGB data supplied from the detection unit 120 is produced on the display; in this condition, the user specifies reference positions within the space 140 by using the operation unit (S30). The position coordinate data (x, y) indicating the specified reference positions is stored in the RAM 152, etc.

Figure 20:
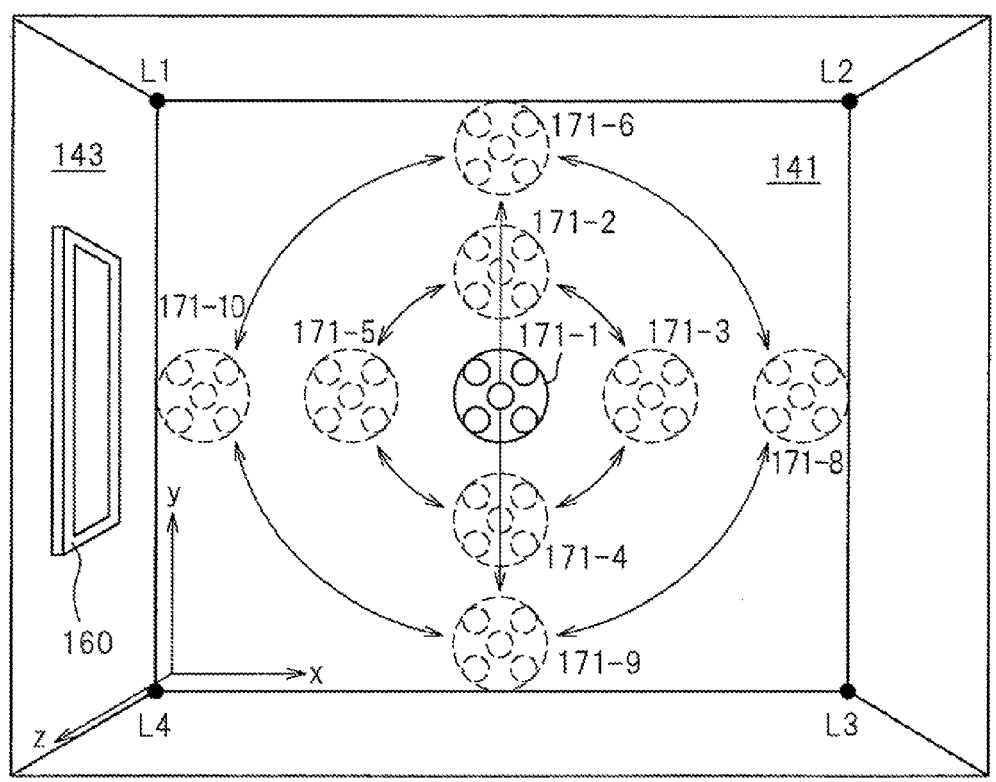
FIG. 20 is a diagram showing one example of an image captured by an RGB color image recognizing camera 121 and produced on a display.

FIG. 20 is a diagram showing one example of the image produced on the display based on the RGB data supplied from the detection unit 120. For example, by specifying four points L1 to L4 in FIG. 20, the floor region 143 in the space 140 can be specified. The reference positions need not be limited to the four corners of the floor 143, but other positions may be specified as the reference positions.

Next, the control unit 150 acquires the depth data from the detection unit 120 (S31), and stores in the RAM 152 the depth data obtained for each pixel contained in the region specified by the reference positions (hereinafter referred to as the "reference region") (S32).

Figure 21:
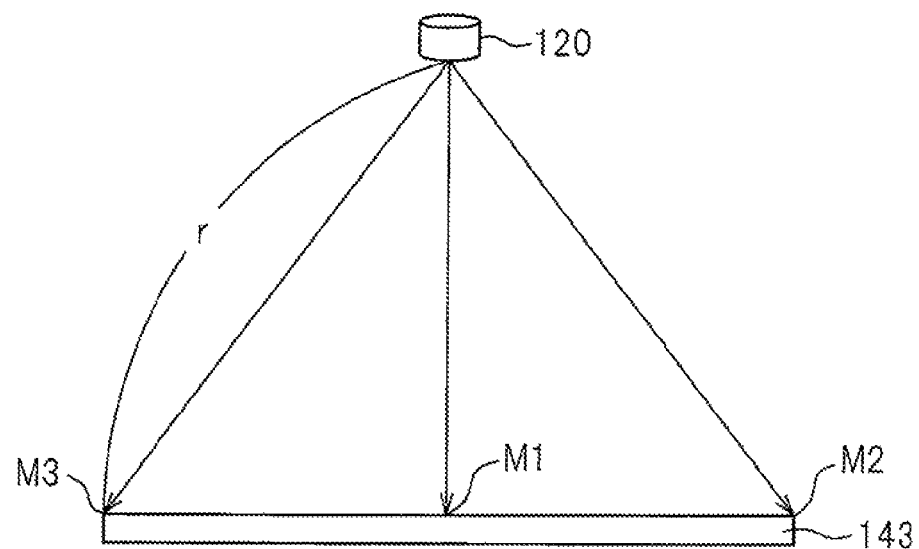
FIG. 21 is a diagram for explaining depth data in a reference region.

FIG. 21 is a diagram for explaining the depth data in the reference region. As shown in FIG. 21, the point M1 on the floor 143 that is located directly below the detection unit 120 and the point M2 or M3 on the floor 143 that is located farther away from the detection unit 120 are on the same floor 143, but there occurs a difference in the depth data acquired from the detection unit 120. In view of this, the position coordinate data and depth data for all the pixels in the reference region (for example, the floor 143) are acquired and stored in advance.

Next, the control unit 150 transmits prescribed image data to the laser projector 130 to project a reference projection image 171 on the reference region, and transmits prescribed control data to the pan-tilt unit 110 to move the reference projection image 171 by controlling the pan-tilt unit 110 (S33). The reference projection image 171 is one that contains five black dots displayed within a circular frame, as shown in FIG. 20. The reference projection image 171 shown in FIG. 20 is one example, and any other suitable image may be used. The reference projection image 171-1 in FIG. 20 is projected at the reference position in the illustrated example located directly below the pan-tilt unit 110. The positional relationship between the pan-tilt unit 110 and the projection surface and the reference position of the projected image can be determined suitably according to the situation.

Next, the control unit 150 acquires the position coordinate data and RGB data from the detection unit 120 (S34). Then, using the five black dots, the control unit 150 identifies the position of the reference projection image 171, and stores a mapping between the control data transmitted to the pan-tilt unit 110 and the position coordinate data of the identified reference projection image 171 in a data table constructed within the RAM 152 (S35).

The control unit 150 repeats the above steps S33 to S35 while moving the reference projection image at predetermined increments so as to cover the entire area of the reference region (S36). In FIG. 20, reference projection images 171-2 to 711-10 are shown, but these are for illustrative purposes, and the amount by which the reference projection image is moved in one operation in order to identify the position can be suitably determined.

By repeating the steps S33 to S35 a prescribed number of times, the control unit 150 completes the construction of the data table that provides a mapping between the control data and the position coordinate data (x, y) and depth data (r) of the projected image for the entire area of the reference region (for example, the floor 143) specified by the reference positions (S37). When the palm region 200 is detected by the method to be described later, the control unit 150 derives its spatial coordinates (x, y, z) in the space 140 from its position data (x, y) and depth data (r) and, using the data table, controls the pan-tilt unit 110 so that the projected image is formed on the palm.

Figure 22:
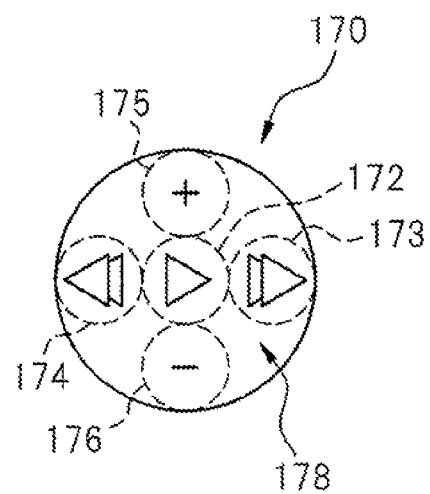
FIG. 22 is a diagram showing an example of an information input image that a laser projector 130 projects.

FIG. 22 is a diagram showing an example of the information input image that the laser projector 130 projects. The information input image 170 shown in FIG. 22 contains a video playback button 172, a fast forward button 173, a rewind button 174, a channel UP button 175, and a channel DOWN button 176. When the fingertip is located, as will be described later, in a selected one of the regions enclosed by dashed lines, it is determined that an information input corresponding to the selected button has been done. The information input image shown in FIG. 22 is only one example, and the laser projector 130 can project various kinds of information input images based on the image data supplied from the control unit 150.

Based on the image data to be transmitted to the laser projector 130, the control unit 150 can identify the kinds of the input buttons contained in the information input image and the positions of the buttons on the information input image. Further, the control unit 150 can identify the position of the information input image on the palm region 200, based on the data table constructed in S37 of FIG. 19 and the control data transmitted to the pan-tilt unit 110. Accordingly, the control unit can also identify the position of each button, based on the image data to be transmitted to the laser projector 130 and the control data transmitted to the pan-tilt unit 110.

FIG. 23 is a diagram showing one example of a palm detection flow.

The CPU 151 of the control unit 150 executes the control flow of FIG. 23 by controlling the pan-tilt unit 110, the detection unit 120, and the laser projector 130 in accordance with a program prestored in the ROM 153 of the control unit 150.

First, the control unit 150 acquires the RGB data and depth data from the detection unit 120 (S40).

Next, based on the RGB data acquired in S40, the control unit 150 identifies regions containing pixels of skin-tone colors (S41). Then, based on the depth data acquired in S40, the control unit 150 organizes the regions containing pixels of skin-tone colors into groups of skin-tone regions, each group comprising pixels having substantially the same depth data (S42). The control unit 150 converts the RGB data acquired from the detection unit 120 into HSV data comprising hue (H: 0 to) 360°, saturation (S: 0 to 255), and value (V: 0 to 255), and recognizes any pixel whose H is in the range of 0 to 30°, whose S is in the range of 80 to 255, and whose V is in the range of 0 to 255 as being a skin-tone pixel. These values of H, S, and V used to judge skin tones are only examples, and other suitable values may be used.

Figure 24A:
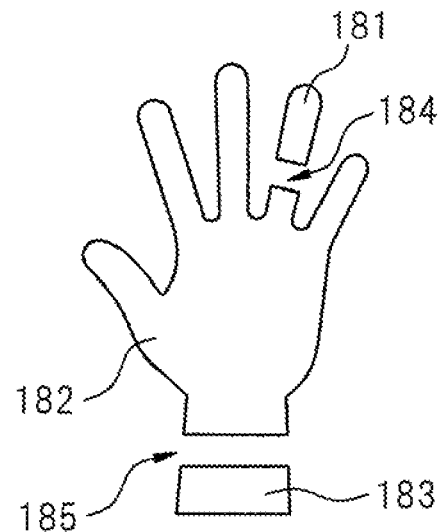
FIG. 24(a) is a diagram (part 1) for explaining how the palm is identified.

FIG. 24(a) is a diagram showing, by way of example, three skin-tone regions 181 to 183 identified by the control unit 150. In FIG. 24(a), the three skin-tone regions have been detected, because the ring (region 184) worn on the user's fourth finger and the watch (region 185) worn around the user's wrist are not skin toned. Then, the control unit 150 detects the region of the intruding object 180 by calculating the difference between the depth data on the reference region (floor 143) recorded in S32 and the depth data acquired in S40 and by extracting pixels for which the difference lies within a predetermined range (for example, within 10 mm). Next, the control unit 150 determines that the three skin-tone regions 181 to 183 located within the detected region of the intruding object 180 belong to the same group (S42). With the process of S41 and S42, it becomes possible to accurately recognize the user's body part forward of the wrist even when the user is wearing an accessory such as a ring or a wrist watch or holding something in his hand.

Next, the control unit 150 determines whether or not the intruding object 180 identified in S42 is the user's body part forward of the wrist (the target body part) by comparing it against the patterns prestored in the ROM 153, etc. (S43). For example, when the user is sitting, a plurality of intruding objects containing skin-tone regions (legs, face, shoulders, etc.) may be recognized, but the body part forward of the wrist (the target body part) can be recognized by performing pattern recognition. The example of FIG. 24 shows the case where the part forward of the wrist of the user's left hand is recognized, but the part forward of the wrist of the user's right hand can also be recognized in the same manner.

When the intruding object is the target body part, the control unit 150 detects the palm region 200 from the intruding object 180, acquires the depth data of the palm region (S44), and stores the data in the RAM 152, etc.

Figure 24B:
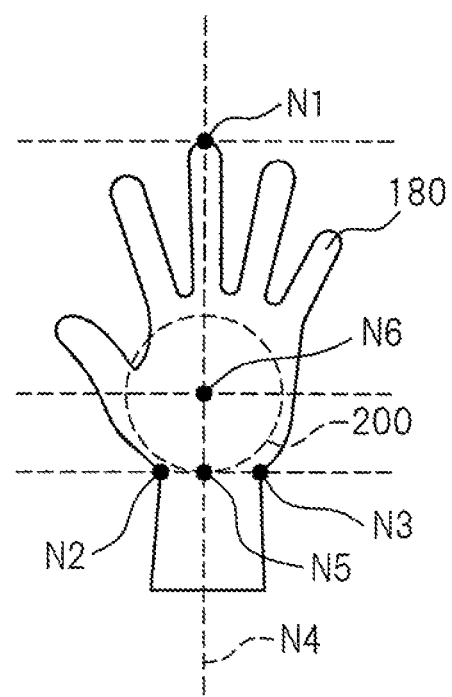
FIG. 24(b) is a diagram (part 2) for explaining how the palm is identified.

FIG. 24(b) is a diagram showing the contour of the intruding object 180 identified as the target body part. The control unit 150 determines the palm region 200 by first drawing a straight line N5 joining the fingertip position N1 to the midpoint N4 between wrist positions N2 and N3 and then drawing a circular region whose center is located at a point N6 one quarter of the way from the midpoint N4 to the fingertip position N1 and whose radius is defined by the distance from N6 to N5. The method of determining the palm region 200 is not limited to the above method, but any other suitable method may be employed.

Next, the control unit 150 derives the spatial coordinates (x, y, z) of the center point N6 of the palm region 200 in the space 140 from the position data (x, y) and depth data (r) of the center point N6. Then, using the data table constructed in S37 of FIG. 9, the control unit 150 controls the pan-tilt unit 110 so that the information input image is projected within the palm region 200 (S45), after which the sequence of operations is terminated. The control unit 150 repeatedly performs the flow of FIG. 23 at predetermined intervals of time (for example, every one second) until the target body part (the part forward of the wrist) is recognized.

Figure 24C:
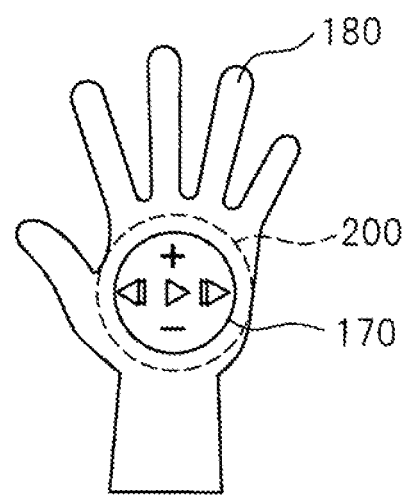
FIG. 24(c) is a diagram (part 3) for explaining how the palm is identified.

FIG. 24(c) shows the condition in which the information input image 170 shown in FIG. 22(a) is projected on the detected palm region 200. Since the size of the projected image is determined by the distance between the projector 30 and the palm region 200, if the image of the same size is projected the information input image 170 may not always fit within the palm region 200. In view of this, in the present embodiment, control is performed to enlarge or reduce the projected image itself according to the depth data of the center point N6 so that the information input image 170 will just fit within the palm region 200. That is, when the user's palm is detected, the information input apparatus 100 moves the information input image 170 so as to follow the user's palm.

Figure 25:
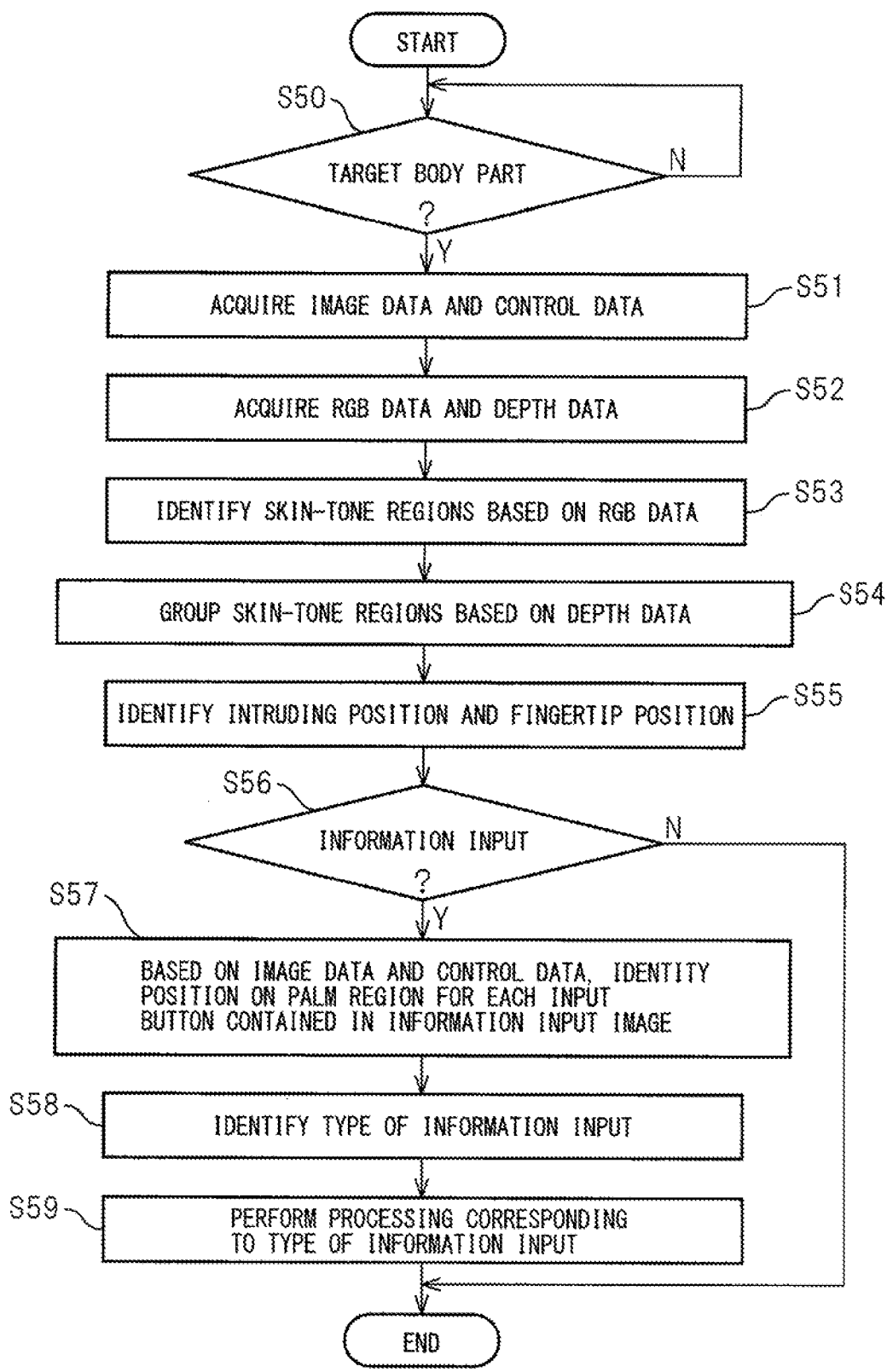
FIG. 25 is a diagram showing one example of an information input control flow.

FIG. 25 is a diagram showing one example of an information input control flow.

The CPU 151 of the control unit 150 executes the control flow of FIG. 25 by controlling the pan-tilt unit 110, the detection unit 120, and the laser projector 130 in accordance with a program prestored in the ROM 153 of the control unit 150.

First, the control unit 50 determines whether the target body part has been recognized or not (S50) (S43 in FIG. 23), and proceeds to carry out the following steps only when the target body part has been recognized.

When the target body part has been recognized, the control unit 150 acquires the image data transmitted to the laser projector 130 and the control data transmitted to the pan-tilt unit 110 (S51). Next, the control unit 150 acquires the RGB data and depth data from the detection unit 120 (S52). The order of S51 and S52 may be interchanged.

Next, based on the RGB data acquired in S52, the control unit 150 identifies other regions containing pixels of skin-tone colors than the skin-tone regions contained in the intruding object 180 detected in S53 of FIG. 23 (S43). Then, based on the depth data acquired in S52, the control unit 150 organizes such other regions containing pixels of skin-tone colors into groups of skin-tone regions, each group comprising pixels having substantially the same depth data (S54). The method of judging skin tones is the same as that used in S41 of FIG. 23, and therefore will not be described here.

Next, based on such other intruding object on which grouping is done in S54, the control unit 150 identifies the positions at which such other intruding object has intruded into the palm region 200 and the position of the fingertip (S55). There may be more than one such other intruding object on which grouping is done in S54, but the control unit 150 recognizes only the region having position coordinates (x, y) within the range of the palm region 200 as being the other intruding object.

Figure 26:
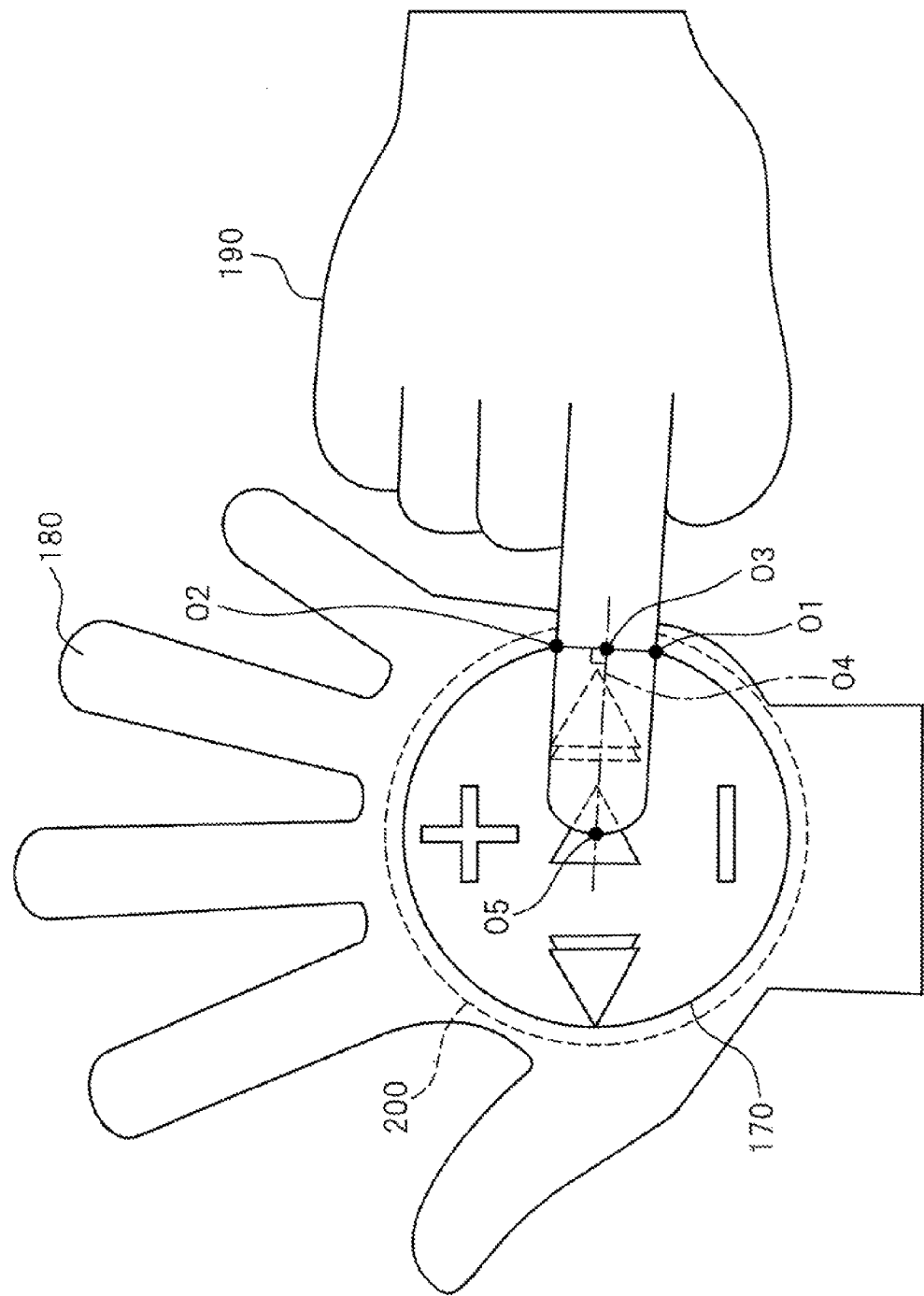
FIG. 26 is a diagram showing, by way of example, an intruding object 180 and another intruding object 190.

FIG. 26 is a diagram showing, by way of example, the intruding object 180 identified in S43 of FIG. 23 and the other intruding object 190 on which grouping is done in S54 of FIG. 25 by the control unit 150. The control unit 150 identifies the intruding positions 01 and 02 of the other intruding object 190 entering the palm region 200. Next, the control unit 150 identifies the midpoint 03 between the intruding positions 01 and 02, and identifies the position of the fingertip by detecting the point 05 at which a perpendicular 04 drawn from the midpoint 03 between the intruding positions 01 and 02 crosses the skin-tone region of the intruding object 190 at the position farthest from the midpoint 03.

Alternatively, the skin-tone region of the intruding object 190 located at the position farthest from the midpoint 03 between the intruding positions 01 and 02 may be identified as the position of the fingertip. The above method of identifying the position of the fingertip based on the intruding positions is only one example, and the position of the fingertip may be identified by some other suitable method.

Next, the control unit 150 determines whether the intruding object 190 is performing an information input operation (S56). If the intruding object 190 exists within the palm region 200, the object may have merely entered the palm region 200 without any intention of performing an information input operation. Therefore, in the control flow, if the fingertip is located in the palm region 200, then it is determined that the fingertip 05 of the intruding object 190 is performing an information input operation. Whether the fingertip is located in the palm region 200 or not is determined based on whether the difference between the depth data of the palm region 200 recorded in S44 of FIG. 23 and the depth data of the fingertip position 05 lies within a prescribed threshold value (for example, within 10 mm).

The depth data of the fingertip position 05 may fluctuate over a short period of time because of chattering, etc. Accordingly, in order to prevent an erroneous detection, it may be determined that an information input is done only when the difference between the depth data of the fingertip position 05 and the depth data of the palm region 200 has remained within the prescribed threshold value continuously for a predetermined length of time (for example, one second or longer).

If it is determined in S56 that the fingertip at position 05 is intended for an information input operation, the control unit 150 identifies the input button position on the palm region 200 for each input button contained in the information input image 170, based on the image data transmitted to the laser projector 130 and the control data transmitted to the pan-tilt unit 110 (S57).

Next, the control unit 150 identifies the kind of the information input operation, based on the fingertip position 05 identified in S55 and the position of each input button on the palm region 200 identified in S57 (S58). For example, if the coordinates of the fingertip position 05 lie within the range of the playback button 172 shown in FIG. 22, the control unit 150 determines that the operation indicated by the information input is "playback". If there is no input button that matches the fingertip position 05, it may be determined that there is no information input.

Next, the control unit 150 performs processing corresponding to the kind of the information input operation identified in S58 (S59), and then terminates the sequence of operations. For example, if the operation indicated by the identified information input is "playback", the control unit 150 sends a "playback" signal to the control target apparatus 160 connected to it. If it is determined in S56 that there is no information input, the sequence of operations is also terminated.

The control flow of FIG. 25 is performed when the target body part is recognized in accordance with the control flow of FIG. 23. It thus becomes possible for the user to perform an information input for "playback" without using an apparatus such as a remote control but by just touching his fingertip to the desired input button (for example, the playback button 172) contained in the information input image 170 projected on the palm region 200.

In the control flow of FIG. 23, it is determined whether the detected object is the target body part or not (S43), and control is performed to project the information input image on the palm region 200 by detecting the palm region 200 from the target body part (S45). It is preferable that the control unit 150 has the function of tracking the movement of the target body when the detected target body part moves (for example, when the user moves around in the room) so that the information input image can always be projected on the palm region 200.

In the control flow of FIG. 25, whenever the target body part is detected in S50, the process proceeds to the subsequent steps. However, a prescribed authentication process may be performed, with provisions made to proceed to the step of determining the presence or absence of an information input operation only when the user is authenticated as being the registered user. Possible methods of authentication include, for example, a method that uses the fingerprint, palm wrinkles, or vein pattern or the like contained in the target body part recognized as the intruding object 180 for detecting the pal region.

The information control apparatus 100 has been described as providing the information input function only, but the information control apparatus 100 may be constructed by including a super-directional speaker so that the sound can be heard by the user only when he is located within the limited area around the spatial coordinate position where the palm region 200 is detected.

Figure 27:
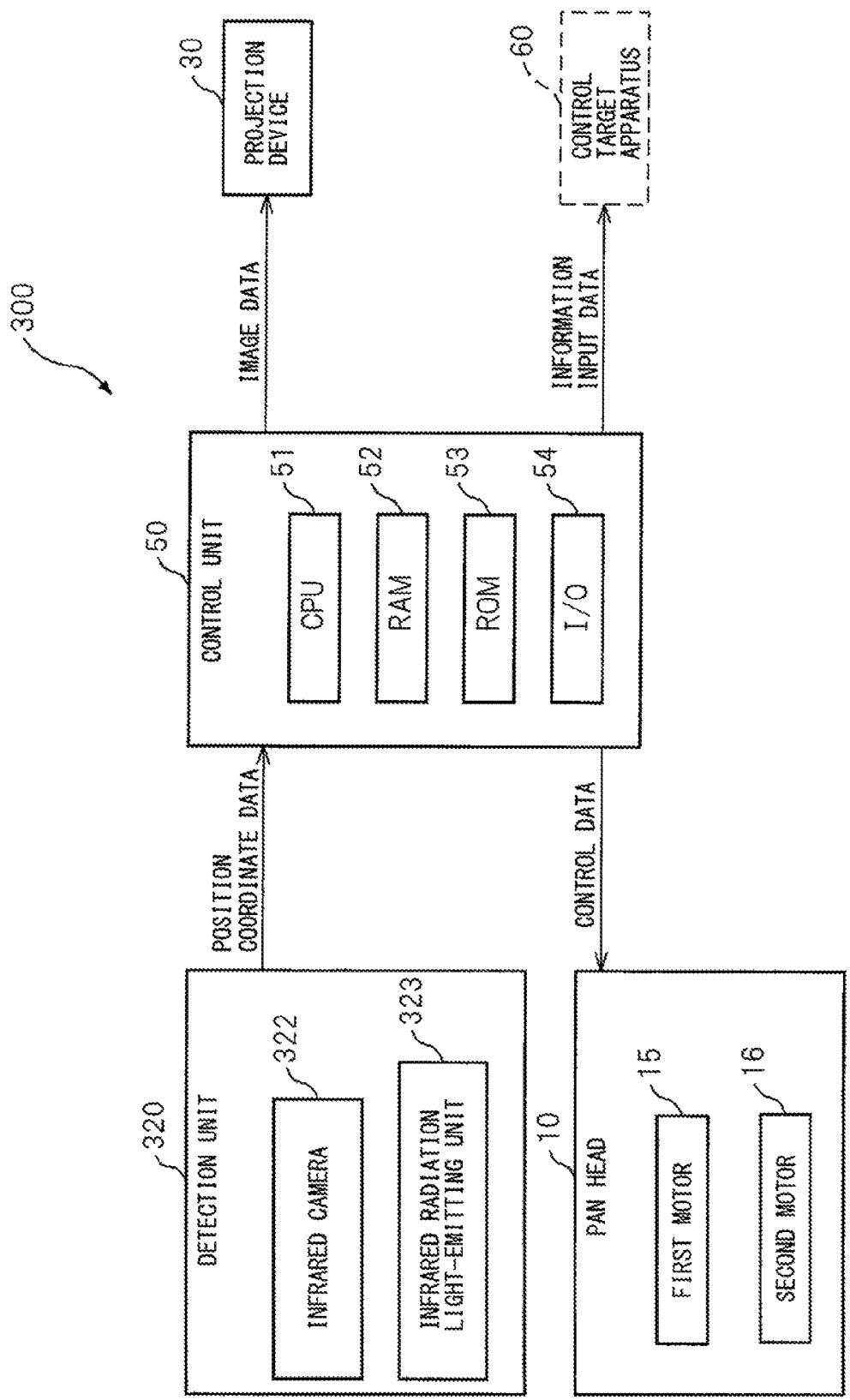
FIG. 27 is a schematic block diagram showing the configuration of an information input apparatus 300.

FIG. 27 is a schematic block diagram showing the configuration of an information input apparatus 300.

The information input apparatus 300 can be used instead of the information input apparatus 1 shown in FIG. 1 or the information input apparatus 100 shown in FIG. 17. The information input apparatus 300 differs from the information input apparatus 1 or the information input apparatus 100 only in the configuration of the detection unit 320; therefore, only the difference will be described below.

The detection unit 320 is fixed to a mounting frame not shown, and comprises an infrared camera 322 and an infrared radiation light-emitting unit 323. The infrared camera 322 receives light reflected from an object located within the recognition range 80 (see FIG. 1), the reflected light being a reflection of infrared light radiated from the infrared radiation light-emitting unit 323, and outputs position coordinate data for each pixel of the captured image.

In the information input apparatus 1 shown in FIG. 1, the detection unit 20 which includes the RGB color image recognizing camera 21 and the infrared camera 22 has been configured to output the depth data as well as the position coordinate data for each pixel of the captured image. By contrast, in the information input apparatus 300, the detection unit 320 is configured to output only the position coordinate data for each pixel of the image captured by the infrared radiation. This is because the user's palm and fingertip can be recognized by using only the image captured by the infrared radiation. Since the depth data is not used in the information input apparatus 300, there can occur cases where the presence or absence of the user's fingertip touching the projection surface (the upper surface of the table 40—see FIG. 1) cannot be detected accurately, but the information input apparatus 300 can be used without any problem when detecting the target body part in a simplified manner.

Figure 28:
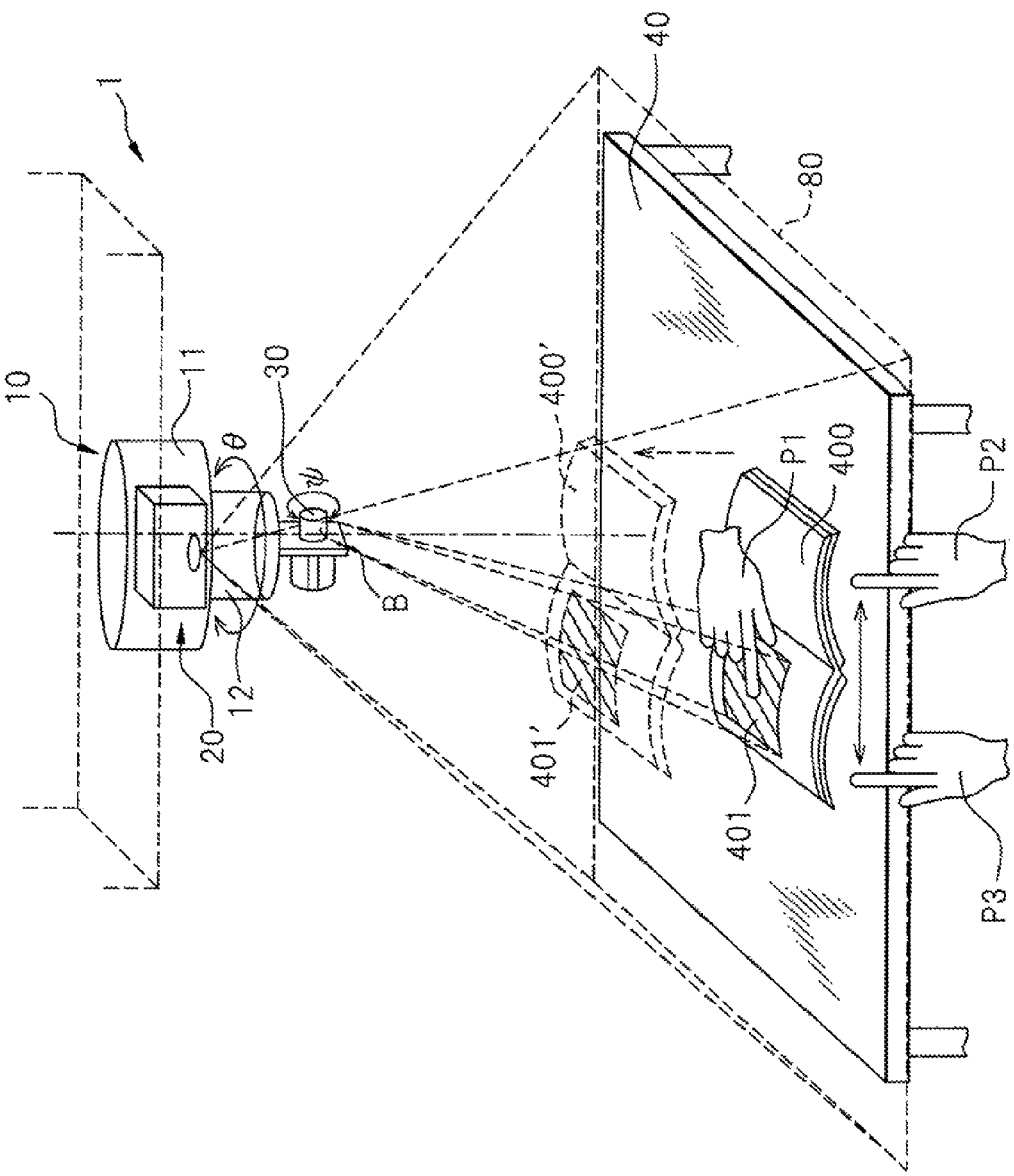
FIG. 28 is a diagram for explaining another information input method that uses the information input apparatus 1 shown in FIG. 1.

FIG. 28 is a diagram for explaining another information input method that uses the information input apparatus 1 shown in FIG. 1.

In the previously described example of FIG. 10 that uses the information input apparatus 1 shown in FIG. 1, the user's fingertip is detected, and control is performed so that the information input image 70 follows the detected fingertip. On the other hand, in the example shown in FIG. 27, the information input image 70 is projected as an image of a substantially square shape, and is used as an illumination for illuminating a portion of a book.

First, the user using his fingertip points to the desired portion of the book 400 to be illuminated (see P1). Then, the control unit 50 in the information input apparatus 1 detects the user's fingertip (see P1) by the previously described method, and controls the pan head 10 and the projection device 30 so that the substantially square image 401 is projected on the desired portion. When the main purpose is the illumination, the image 401 is just a white image of a substantially square shape.

Since the size of the portion to be illuminated differs according to the size of the book 400, etc., it is preferable to make provisions so that the size of the image 401 can be changed as the fingertip is moved across the projection surface (the upper surface of the table 40) (see P2 and P3). In this case, the projection surface functions as an operation input scale for changing the size of the image 401.

It is also preferable to make provisions so that when the user moves the book 400 within the recognition range 80, the detection unit 20 detects the movement of the book 400, and the image 401 is moved so as to follow the moving book 400' by controlling the pan head 10 and the projection device 30 (see the image 401'). In this case, the control unit 50 in the information input apparatus 1 recognizes the shape of the book 400, and moves the image 401 to follow the moving book 400, not the user's fingertip. Depending on the position of the moved book 400 within the recognition range 80, there can occur cases where the shape and orientation of the image 401' do not match the user's desired portion of the book 400 if the projection device 30 is simply moved. In such cases, it is preferable to automatically adjust the shape and orientation of the image 401' as earlier described with reference to FIGS. 14 and 15.

Figure 29:
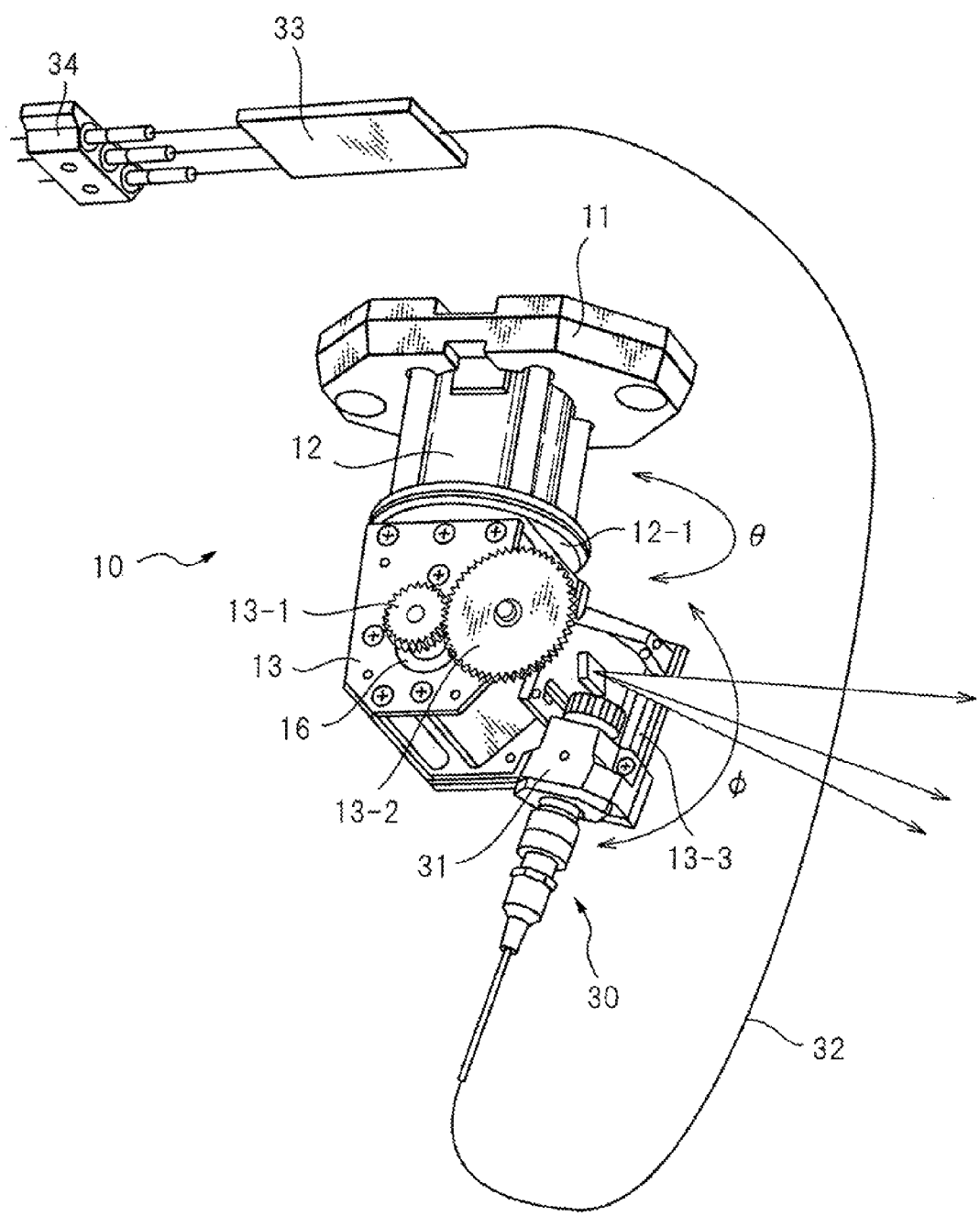
FIG. 29 is a diagram showing one configuration example of a pan head 10 and projection device 30 depicted in FIG. 1.

FIG. 29 is a diagram showing one configuration example of the pan head 10 and the projection device 30 depicted in FIG. 1. The configuration of the pan head 10 and the projection device 30 shown in FIG. 29 is only one example, and is not limited to this particular example.

The pan head 10 includes a second rotating part 13 for tilting, to which a projection head 31 of the projection device 30 is fixed, a first rotating part 12 for panning, on which the second rotating part 13 is supported, and a base 11 on which the first rotating part 12 is supported.

The second rotating part 13 holds the projection head 31 of the projection device 30 so as to be rotatable in direction φ by such moving members as a first gear 13-1 attached to a second motor 16 and a second gear 13-2 that engages with the first gear 13-1. The first rotating part 12 holds the second rotating part 13 so as to be rotatable in direction θ by moving a rotating plate 12-1 by means of a first motor 15.

The projection device 30 comprises a fiber pigtail module 34 for fixedly holding RGB laser light fibers, an RGB fiber combiner 33 for combining the lights from the RGB laser light fibers, a visible single-mode fiber 32, and the projection head 31. The visible single-mode fiber 32 has the function of introducing the combined light from the RGB fiber combiner 33 into the projection head 31 fixed to the second rotating part 13. The fiber pigtail module 34 is connected to an RGB laser light generating apparatus not shown.

Figure 30:
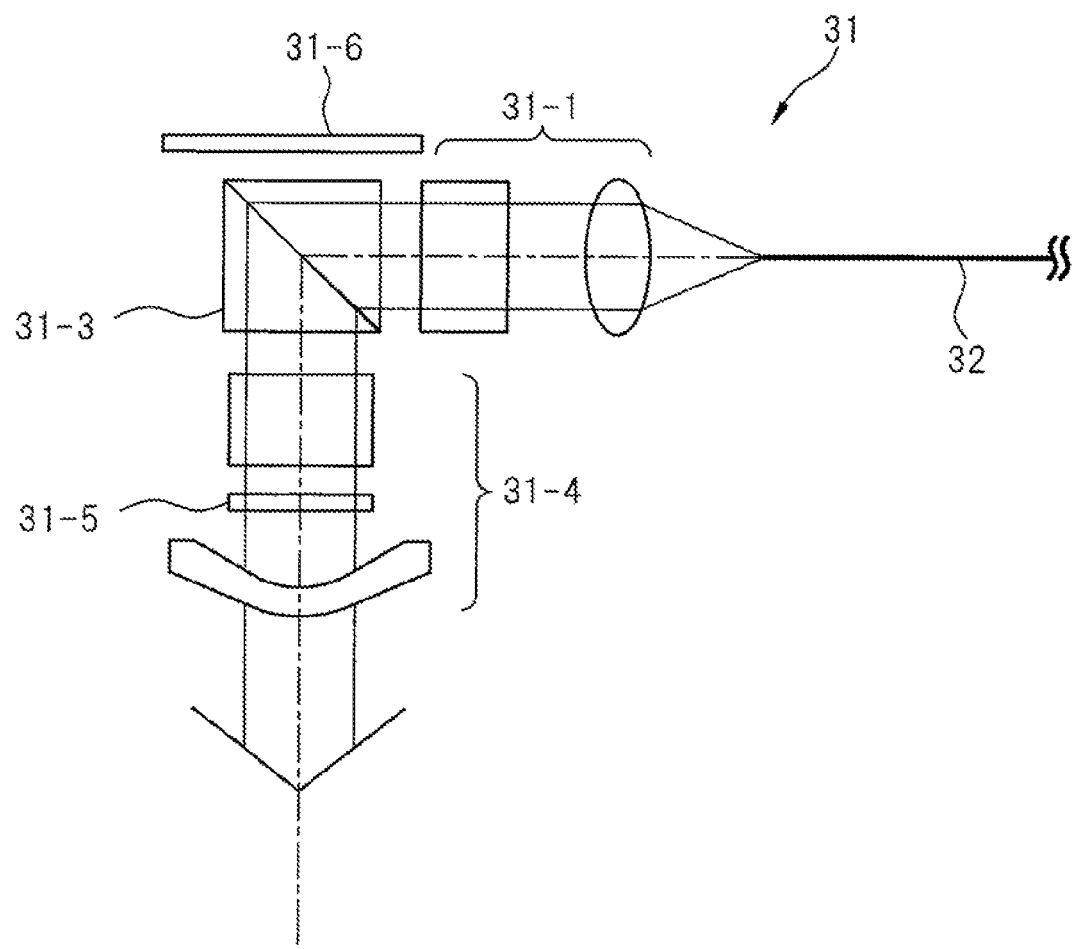
FIG. 30 is a diagram showing one example of a projection head 31 depicted in FIG. 29.

FIG. 30 is a diagram showing one example of the projection head 31 depicted in FIG. 29.

The projection head 31 comprises an illumination optical system 31-1 for producing illuminating light from the light introduced through the visible single-mode fiber 32, a polarization beam splitter 31-3, a projection optical system 31-4, a diffusing plate 31-5, and a micro-display 31-6. The projection head 31 has the function of projecting an image produced on the micro-display 31-6 through the projection optical system 31-4 onto a target surface by using the laser light introduced through the visible single-mode fiber 32.

Figure 31:
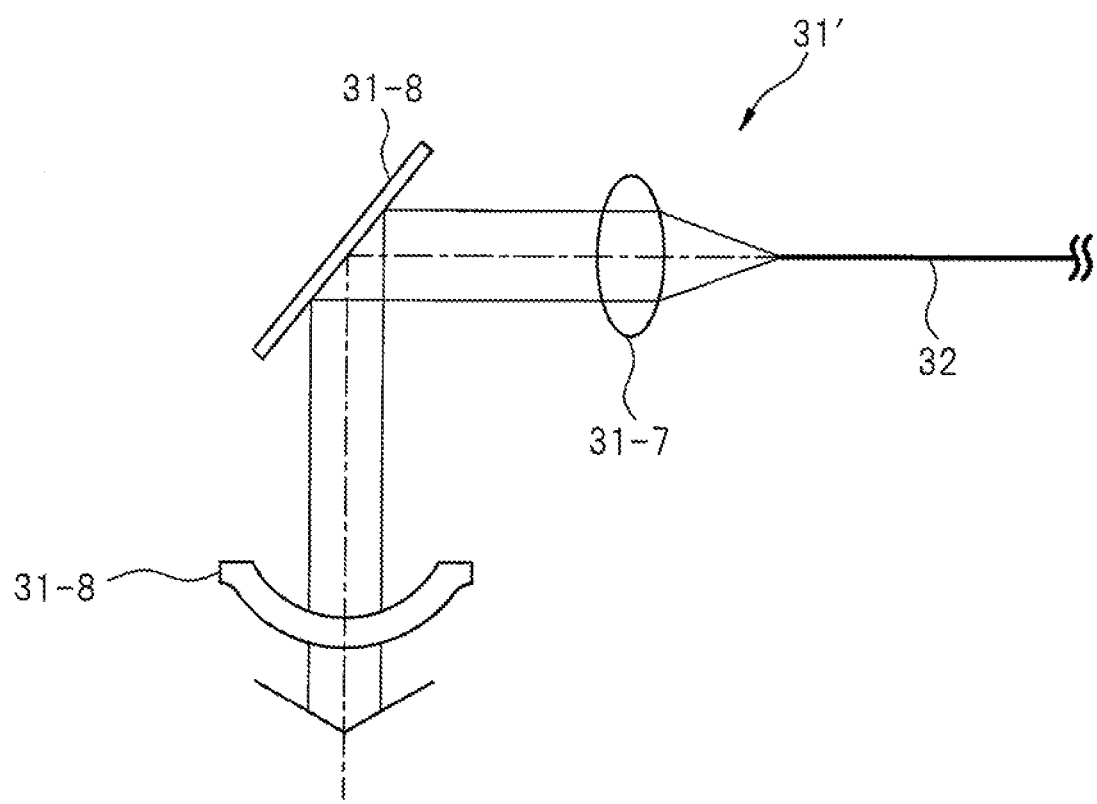
FIG. 31 is a diagram showing an alternative example of the projection head 31 depicted in FIG. 29.

FIG. 31 is a diagram showing an alternative example of the projection head 31 depicted in FIG. 29.

The alternative projection head 31' shown in FIG. 31 comprises an illumination optical system 31-7 for producing illuminating light from the light introduced through the visible single-mode fiber 32, a two-axis scanning MEMS (Micro Electro Mechanical System) mirror 31-8, and a projection optical system 31-8.

Figure 32:
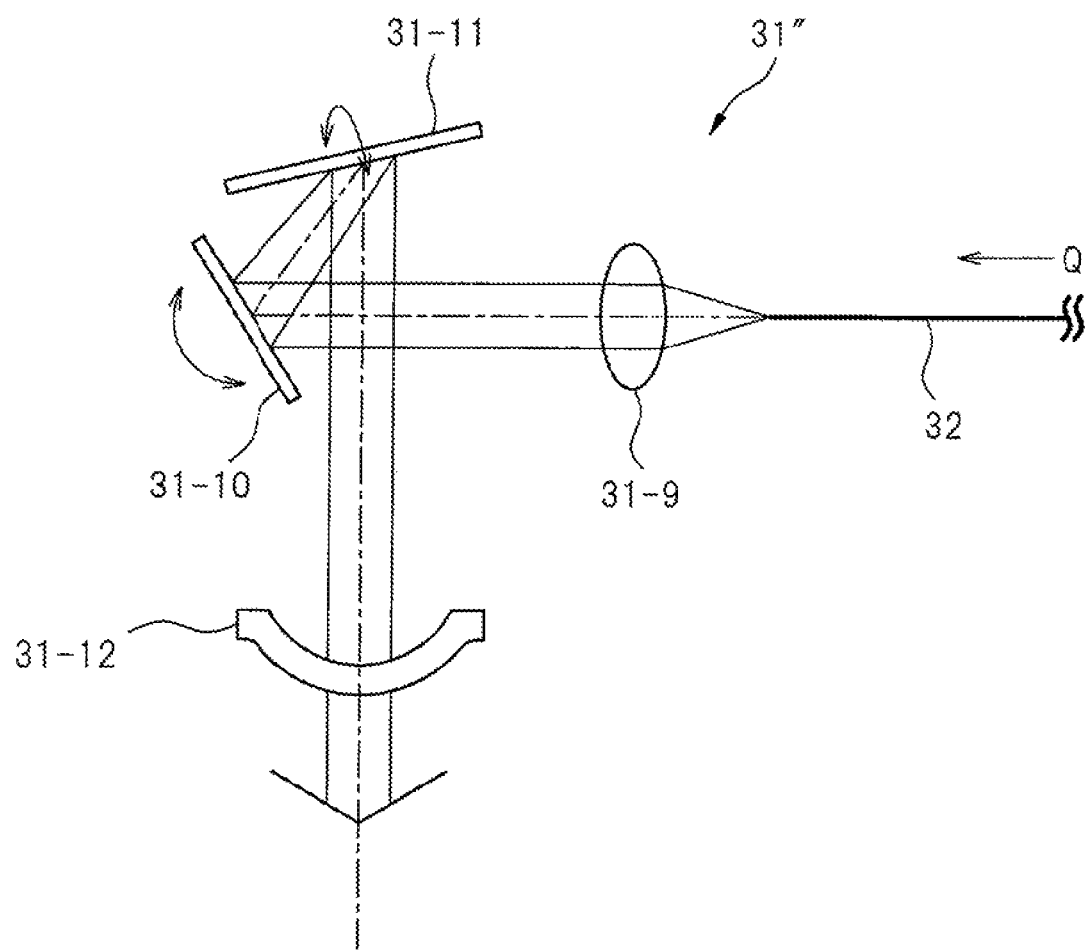
FIG. 32 is a diagram showing a further alternative example of the projection head 31 depicted in FIG. 29.

FIG. 32 is a diagram showing a further alternative example of the projection head 31 depicted in FIG. 29.

The further alternative projection head 31" shown in FIG. 32 comprises an illumination optical system 31-9 for producing illuminating light from the light introduced through the visible single-mode fiber 32, a horizontal scanning first MEMS mirror 31-10, a vertical scanning MEMS mirror 31-11, and a projection optical system 31-12.

What is claimed is:

1. An information input apparatus comprising:
    a projection unit having a laser emitting part in order to project an input image;
    a projection position changing unit which changes the projection position of said input image by moving said projection unit;
    a unit for emitting infrared radiation:
    a detection sensor which detects depth of data by using said infrared radiation and color data; and
    an information detection unit which causes said projection position changing unit to change the projection position of said input image by moving said projection unit so as to track a position of a palm region detected by said detection sensor based on said depth data and said color data supplied from said detection sensor,
    wherein said information detection unit which obtains first depth data of a reference region and second depth data detected by said detection sensor, and which compares the first depth data and the second depth data each other, and which recognizes a region where a difference between the first depth data and the second depth data lies within a predetermined range as said palm region, and
    wherein said information detection unit detects the information input to said input image by identifying a position of a fingertip on said input image based on said second depth data and said color data supplied from said detection sensor.

2. The information input apparatus according to claim 1, wherein said information detection unit performs control so that the input image is projected on said palm region by controlling said projection position changing unit.

3. The information input apparatus according to claim 1, wherein said projection unit emits a beam by using said laser emitting part and a Micro Electro Mechanical System (MEMS) mirror.

4. The information input apparatus according to claim 1, wherein said laser emitting part emits a beam by using a micro-display.

5. The information input apparatus according to claim 1, wherein said projection position changing unit includes a first rotation axis for panning said projection unit and a second rotation axis for tilting said projection unit.

* * * * *